(12) United States Patent
Ashikaga et al.

(10) Patent No.: US 10,273,316 B2
(45) Date of Patent: Apr. 30, 2019

(54) METHOD AND DEVICE FOR MANUFACTURING CURED LIGHT-CURING RESIN COMPOSITION

(71) Applicant: HERAEUS KABUSHIKI KAISHA, Tokyo (JP)

(72) Inventors: Kazuo Ashikaga, Tokyo (JP); Kiyoko Kawamura, Tokyo (JP); Teruo Orikasa, Tokyo (JP)

(73) Assignee: HERAEUS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/819,839

(22) Filed: Nov. 21, 2017

(65) Prior Publication Data

US 2018/0171036 A1 Jun. 21, 2018

Related U.S. Application Data

(62) Division of application No. 15/108,762, filed as application No. PCT/JP2015/073832 on Aug. 25, 2015, now Pat. No. 9,868,796.

(30) Foreign Application Priority Data

Sep. 11, 2014 (JP) .................. 2014-185132

(51) Int. Cl.
*C08F 2/46* (2006.01)
*B29C 71/04* (2006.01)
(Continued)

(52) U.S. Cl.
CPC .............. *C08F 2/46* (2013.01); *B01J 19/123* (2013.01); *B01J 19/128* (2013.01); *B29B 13/08* (2013.01);
(Continued)

(58) Field of Classification Search
CPC ....... B01J 19/123; B01J 19/128; B05D 3/067; C08J 3/28
(Continued)

(56) References Cited

U.S. PATENT DOCUMENTS 5,580,614 A * 12/1996 Amberg-Schwab ..... C09D 4/00
427/387
6,726,795 B1 4/2004 Wojciak et al.
(Continued)

FOREIGN PATENT DOCUMENTS

JP 50-98092 A 4/1975
JP 59-132974 A 7/1984
(Continued)

OTHER PUBLICATIONS

Written Opinion of the International Search Authority dated Mar. 17, 2016 in connection with International Application PCT/JP2015/073832.
(Continued)

*Primary Examiner* — Fred M Teskin
(74) *Attorney, Agent, or Firm* — Cooper & Dunham LLP

(57) ABSTRACT

A technology for curing a photocurable resin composition by ultraviolet ray/infrared ray hybrid irradiation is provided. An infrared ray irradiation is applied at least one of before or after the application of ultraviolet ray irradiation to a photocurable resin composition, to have the photocurable resin composition cured. It becomes possible to relax the ultraviolet ray irradiation conditions for photo curing by applying an infrared ray irradiation as compared with the case in which the infrared ray irradiation is not applied, and, in particular, the scratch resistance characteristics of a cured film are significantly enhanced. Moreover, because of a combination of ultraviolet ray irradiation and infrared ray irradiation, the curing time period of a cured film can be (Continued)

reduced and/or stress relaxation effects can be produced. Besides, it becomes possible to control the reflectance of a cured film by varying an irradiation amount of infrared ray.

5 Claims, 32 Drawing Sheets

(51) Int. Cl.
| | |
|---|---|
| *B29B 13/08* | (2006.01) |
| *C08F 2/01* | (2006.01) |
| *C08F 2/48* | (2006.01) |
| *C08G 59/18* | (2006.01) |
| *C08F 290/00* | (2006.01) |
| *B01J 19/12* | (2006.01) |
| *C08F 2/50* | (2006.01) |
| *C08G 59/38* | (2006.01) |
| *C08G 59/40* | (2006.01) |
| *C08J 3/28* | (2006.01) |

(52) U.S. Cl.
CPC ............... *B29C 71/04* (2013.01); *C08F 2/01* (2013.01); *C08F 2/48* (2013.01); *C08F 2/50* (2013.01); *C08F 290/00* (2013.01); *C08G 59/18* (2013.01); *C08G 59/38* (2013.01); *C08G 59/40* (2013.01); *B01J 2219/1203* (2013.01)

(58) Field of Classification Search
USPC ........................................ 427/493; 422/186.3
See application file for complete search history.

(56) References Cited

U.S. PATENT DOCUMENTS

| | | | |
|---|---|---|---|
| 2010/0183820 A1 | 7/2010 | Seubert et al. | |
| 2016/0326275 A1 | 11/2016 | Ashikaga et al. | |

FOREIGN PATENT DOCUMENTS

| | | | |
|---|---|---|---|
| JP | 59-168073 A | 9/1984 | |
| JP | 61-165754 A | 7/1986 | |
| JP | 09-118706 A | 10/1995 | |
| JP | 08-039577 A | 2/1996 | |
| JP | 08-039953 A | 2/1996 | |
| JP | 11-128826 A | 5/2001 | |
| JP | 2001-170561 A | 6/2001 | |
| JP | 2004-505159 A | 2/2009 | |
| WO | WO 2016/039129 A1 | 3/2016 | |

OTHER PUBLICATIONS

International Search Report (included English Language Translation) dated Mar. 17, 2016 in connection with International Application PCT/JP2015/073832.

Communication Pursuant to Article 94(3) dated Nov. 16, 2018 in connection with European Patent Application No. 15840770.0.

* cited by examiner

| Time from IR irradiation to UV irradiation | 12 sec | 14 sec | 15 sec | 18 sec |
|---|---|---|---|---|
| Effectiveness of pre IR irradiation | Effective | Effective | Ineffective | Ineffective |

| UV irradiation time (sec.) | pre IR irradiation time (sec.) | | | | |
|---|---|---|---|---|---|
| | 0 | 0.15 | 0.3 | 0.6 | 1.2 |
| 0.15 | 69.5 | 71.4 | 71.3 | | |
| 0.3 | 73.5 | | 77.6 | 86 | |
| 0.6 | 83.7 | | | 84.9 | 90.5 |
| 1.2 | 90.4 | | | | 95.6 |

Fig. 11

| Time from UV irradiation to IR irradiation | 1 min | 2 min | 5 min | 10 min | 1 hour | 3 hour |
|---|---|---|---|---|---|---|
| Effectiveness of post IR irradiation | effective | effective | effective | effective | effective | ineffective |

METHOD AND DEVICE FOR MANUFACTURING CURED LIGHT-CURING RESIN COMPOSITION

CROSS-REFERENCE TO RELATED APPLICATIONS

This application is a divisional of U.S. Ser. No. 15/108,762 (now U.S. Pat. No. 9,868,796), which is a § 371 national stage of PCT International Application No. PCT/JP2015/073832, filed Aug. 25, 2015, claiming priority of Japanese Patent Application No. 2014-185132, filed Sep. 11, 2014, the content of each of which are hereby incorporated by reference into the application.

FIELD OF TECHNOLOGY

The present invention relates to an apparatus and a method for manufacturing a cured photocurable resin composition, and in particular, to a technology for curing a photocurable resin composition by a hybrid irradiation including infrared irradiation and ultraviolet irradiation.

PRIOR ART

In general, the photocurable resin composition includes, as main components, (1) monomers, (2) prepolymers (oligomers), and (3) photo polymerization initiators, wherein the monomers act as a solvent to be combined with the prepolymers to thereby form a chain-like cured material. Although the prepolymers form the core of a cured resin, since neither the monomers nor the prepolymers initiate a polymerization reaction by themselves with ease, the photo polymerization initiators are included as a component for initiating such a polymerization reaction. The photo polymerization initiators become activated through absorption of light (in particular, UV) to thereby initiate such reactions as cleavage reaction, hydrogen abstraction and electron transfer so that there are produced such materials as radical molecules and hydrogen ions that initiate the polymerization reaction. These materials thus produced react with the monomers and the polymers to cause a three-dimensional cross-linking polymerization reaction. Upon formation of molecules having sizes larger than a certain value due to such polymerization reaction, the photocurable resin composition changes from the liquid state to the solid state to become cured. The light to be irradiated for activation of the photo polymerization initiator is, typically, ultraviolet light (UV) so that such a photo curing process is also called UV curing.

The above-described photocurable resin compositions are in use in various applications; for example, use is made of the case for manufacturing a hard coat layer of a hard coat film. When applied to the hard coat layer, there is a case in which the thickness of the film is required to be made thinner, which, in turn, could cause a problem of curling of the film. In order to mitigate the occurrence of such curling, it has been proposed to add metal oxide ultra fine particles, such as colloidal silica (Japanese Pat. Laid-open Pub. No. 2005-288787). However, since the addition of such additives could lower the cross-linking density to thereby lower the hardness characteristics, there arises a difficult problem of the necessity to establish the compatibility between the prevention of curling and the hardness characteristics.

Incidentally, a technology for blowing a hot air with the irradiation of infrared light prior to irradiation of ultraviolet light is described in Japanese Pat. Laid-open Pub. No. Hei 8-39577. In this technology, however, the irradiation of infrared light is implemented so as to have the aqueous volatile components in a UV curing type water borne resin applied to a material to be irradiated (e.g., printed material) evaporated, and, then, the irradiation of ultraviolet light is implemented to cure the applied film. Furthermore, as a similar technology, a technology for implementing the irradiation of infrared light after applying an ultraviolet light curing type ink on a piece of paper (printed material) and then implementing the irradiation of ultraviolet light to cure the ink is described in Japanese Pat. Laid-open Pub. No. Hei 8-39953. The curing technologies described in these prior art references are based on the principle that, although a large number of UV curing lamps are required if the removal of volatile components and curing are to be carried out at the same time by the irradiation of ultraviolet light alone, the curing rate can be enhanced without increasing the number of UV lamps by removing the volatile component by the irradiation of infrared light and thereafter implementing curing by the irradiation of ultraviolet light.

Besides, there are cases in which the amount of the photo polymerization initiators is increased so as to promote the curing reaction by ultraviolet light. However, this would cause a problem of increasing the process cost because the photo polymerization initiators are relatively expensive. There is also another problem in which although the curing reaction can be promoted to some extent in low irradiation conditions for the irradiation of ultraviolet light, it is not so effective in high irradiation conditions. Therefore, a technology capable of implementing a photo curing reaction securely and at a lower cost under any irradiation condition of ultraviolet light is desired.

PRIOR ART REFERENCES

Patent References

Patent Reference 1: Pat. Laid-open Pub. No. 2005-288787
Patent Reference 2: Pat. Laid-open Pub. No. 8-39577
Patent Reference 3: Pat. Laid-open Pub. No. 8-39953

SUMMARY OF THE INVENTION

Problems to be Solved by the Invention

The present invention has been made in view of the above and has an object to solve the disadvantages of the prior art as described above and to provide an improved method and apparatus for manufacturing a cured photocurable resin composition. Another object of the present invention is to provide a curing technology of a photocurable resin composition which can significantly reduce the irradiation time of ultraviolet light required for the conventional photo curing reaction. Moreover, a further object of the present invention is to provide a curing technology which can cure a photocurable resin composition with an increased cross-linking density and an enhanced scratch resistance characteristic. A still further object of the present invention is to provide a curing technology which can reduce the curling of a cured photocurable resin composition without using a special additive.

Means for Solving the Problems

According to one aspect of the present invention, there is provided a method for manufacturing a cured photocurable resin composition characterized by: applying infrared light (IR) irradiation at least one of before or after an application of ultraviolet light (UV) to a photocurable resin composition, from which volatile components have been removed by a heating process, and applying ultraviolet light (UV) irradiation to the photocurable resin composition over an ultraviolet light irradiation time shorter than an irradiation time which is necessary for the photocurable resin composition to reach a predetermined degree of curing by the ultraviolet irradiation alone to thereby produce a degree of curing which is equal to or greater than the predetermined degree of curing.

Preferably, the predetermined degree of curing is such a degree of curing in which when a surface of the cured photocurable resin composition is scrubbed by a scrubbing material under a predetermined condition, no scratch is produced in the surface. Preferably, the scrubbing material is steel wool. Preferably, the predetermined condition is such that the scrubbing material is reciprocated over a predetermined number of times (e.g., 10) under loading of 500 g/cm². Preferably, confirmation of the production of scratch is carried out by visual observation or haze measurements of the surface after it has been scrubbed.

Preferably, in the case of pre IR irradiation, i.e., application of UV irradiation after the application of IR irradiation, the UV irradiation is applied within a first predetermined time period upon application of the IR irradiation. The first predetermined time period is, for example, 14 seconds.

Preferably, in the case of post IR irradiation, i.e., application of IR irradiation after the application of UV irradiation, the IR irradiation is applied within a second predetermined time period upon application of the UV irradiation. The second predetermined time period is, for example, 1 hour.

Preferably, the photocurable resin composition is of the photo radical curing system or photo cationic curing system. In addition, preferably, the photo radical curing system is at least one of the polyester acrylate system, urethane acrylate system, and epoxy acrylate system. In one embodiment, in the case when the photocurable resin composition is of the photocationic curing system, the post IR irradiation is applied.

According to another aspect of the present invention, there is provided a curing apparatus, comprising:

transporting means for transporting a photocurable resin composition along a predetermined path;

driving means for driving the transporting means at an arbitrarily set transport velocity;

heating means for removing volatile components from the photocurable resin composition;

ultraviolet light irradiation device located above the transport path and downstream of the heating means for applying ultraviolet light (UV) irradiation to the photocurable resin composition; and infrared light irradiation device located above the transport path and at least one of upstream or downstream of the ultraviolet light irradiation device for applying infrared light (IR) irradiation to the photocurable resin composition.

In one embodiment, the transport velocity can be set within a range between 1 m/min and 200 m/min.

In one embodiment, the heating means may include at least one of at least one IR lamp, a hot air blower, and an electric heater.

In one embodiment, the UV irradiation device includes at least one UV lamp (as an example, 250 mm in length and 13 mm in diameter), whose output wavelength ranges between 200 and 450 nm and whose output is variable in a range between 84 and 240 W/cm. The UV lamp may be selected from a group including an electrodeless lamp, a medium pressure mercury lamp, a metal halide lamp, and LED. Preferably, the UV irradiation device has effective irradiation dimensions of 200 mm in width normal to the transport direction and 200 mm in length in line with the transport direction. A vertical distance between the UV lamp and a test sample is 53 mm.

In one embodiment, the IR irradiation device includes four carbon IR lamps (as an example, 300 mm in length and 19 mm in diameter) with rated output of 1 kW (rated power: 230 V), whose output wavelength ranges between 1 and 6 micrometers and whose output is variable in a range between 4.2 and 33.3 W/cm. Preferably, the IR irradiation device has effective irradiation dimensions of 200 mm in width normal to the transport direction and 200 mm in length in line with the transport direction. A vertical distance between each of the IR lamps and a test sample on a surface of the transporting means is 53 mm.

Effects of the Invention

In accordance with the present invention, a curing process can be implemented at a lower cost and more expeditiously than the prior art. Besides, the curing process can be carried out while promoting the cross-linking reaction and improving the scratch resistance characteristic. In addition, the amount of use of photo polymerization initiators to be used for attaining the same degree of curing can be reduced. Moreover, curl of a cured photocurable resin composition can be reduced without using a special additive.

BRIEF DESCRIPTION OF THE DRAWINGS

FIG. 3A and FIG. 3B are graphs showing a relationship between UV irradiation time and UV output with IR irradiation intensity as a parameter for the result of a test using the polyester acrylate system as the photo radical curing system (embodiment 1), wherein FIG. 3A is a plot diagram of the test result and FIG. 3B is a region diagram in which regions of respective IR irradiation intensities are determined based on the plot diagram.

FIG. 6A and FIG. 6B are graphs showing a relationship between UV irradiation time and UV output with IR irradiation intensity as a parameter for the result of a test using the urethane acrylate system as the photo radical curing system (embodiment 2), wherein FIG. 6A is a plot diagram of the test result and FIG. 6B is a region diagram in which regions of respective IR irradiation intensities are determined based on the plot diagram.

FIG. 7A and FIG. 7B are graphs showing a relationship between UV irradiation time and UV output with IR irradiation intensity as a parameter for the result of a test using the epoxy acrylate system as the photo radical curing system (embodiment 3), wherein FIG. 7A is a plot diagram of the test result and FIG. 7B is a region diagram in which regions of respective IR irradiation intensities are determined based on the plot diagram.

FIG. 8A and FIG. 8B are graphs showing a relationship between UV irradiation time and UV output with IR irradiation intensity as a parameter for the result of a case (embodiment 4), in which photo polymerization initiator Irgacure 184 used in embodiment 1 of FIG. 3A and FIG. 3B has been substituted with Lucirin TPO, wherein FIG. 8A is a plot diagram of the test result and FIG. 8B is a region diagram in which regions of respective IR irradiation intensities are determined based on the plot diagram.

FIG. 9A and FIG. 9B are graphs showing a relationship between UV irradiation time and UV output with IR irradiation intensity as a parameter for the result of a test using the photo cationic curing system (embodiment 5), wherein FIG. 9A is a plot diagram of the test result and FIG. 9B is a region diagram in which regions of respective IR irradiation intensities are determined based on the plot diagram.

FIG. 11 is a table showing the effects of the pre IR for acrylic group double bond reaction rate (%).

FIG. 27A and FIG. 27B are graphs showing a relationship between UV irradiation time and UV output with IR irradiation intensity as a parameter for the result of a test using the photocurable resin composition of (embodiment 5) and applying IR irradiation after UV irradiation, wherein FIG. 27A is a plot diagram of the test result and FIG. 27B is a region diagram in which regions of respective IR irradiation intensities are determined based on the plot diagram.

CONFIGURATIONS FOR EMBODYING THE PRESENT INVENTION

Figure 1:
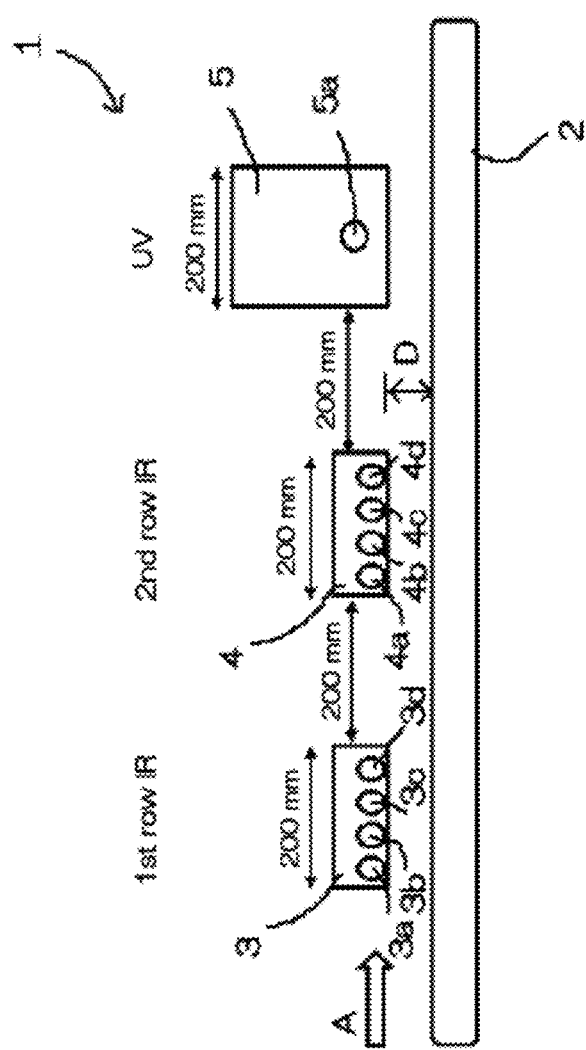
FIG. 1 is a schematic illustration of an IR/UV hybrid irradiation system.

In order to verify the curing characteristics of photocurable resin compositions by IR/UV hybrid irradiation, use has been made of an IR/UV hybrid irradiation system 1 having a basic structure as shown in FIG. 1. The irradiation system 1 includes an endless belt 2 having a width of 600 mm as transporting means for transporting test samples in the direction of arrow A. The transporting velocity of endless belt 2 can be set at an arbitrary velocity between the minimum velocity (0.5 m/min) and the maximum velocity (200 m/min), but, in the present test, the transporting velocity was set in a range between 1 m/min and 200 m/min. A first row IR irradiation device 3 is disposed at the upstream side of endless belt 2 and above the endless belt 2, and a second row IR irradiation device 4 is disposed at a location 200 mm away from and in the downstream of the first row IR irradiation device 3. Moreover, at a location 200 mm away from and in the downstream of the second row IR irradiation device 4 is disposed a UV irradiation device 5. These IR irradiation devices 3 and 4 and UV irradiation device 5 may be disposed with their positions exchanged respectively and at least one of the irradiation devices may be omitted. It is to be noted, however, in the present system 1, the separation distance between a pair of adjacent irradiation devices in the direction of transport direction A is maintained at 200 mm.

The first row IR irradiation device includes four IR lamps 3a through 3d and these four IR lamps are disposed with their longitudinal directions normal to the transport direction A and spaced apart from each other. In the illustrated example, the IR irradiation device 3 has an irradiation opening whose length in the direction of transport direction A is 200 mm and whose width in the direction normal to transport direction A is 300 mm. In the illustrated example, each of IR lamps 3a through 3d is a carbon IR heater having a rated output of 1 kW (rated voltage: 230 V) and its output wavelength ranges between 1 and 6 micrometers and its output is variable in a range between 4.2 and 33.3 W/cm. In addition, each of the IR lamps is 300 mm in length (light-emitting length) and 19 mm in diameter.

The second row IR irradiating device 4 includes four IR lamps 4a through 4d and its structure is identical to that of the first row IR irradiating device 3.

The UV irradiating device 5 includes a single UV lamp 5a which extends with its longitudinal direction normal to transport direction A. In the illustrated example, the UV irradiating device 5 includes an irradiation opening, which is 200 mm in length in the direction of transport direction A and is 250 mm in width in the direction normal to transport direction A. In the illustrated example, the output wavelength of the UV lamp 5a ranges between 200 nm and 450 nm and its output is variable in a range between 84 and 240

W/cm. In addition, the UV lamp 5a is 250 mm in length (light-emitting length) and 13 mm in diameter.

Incidentally, a distance D between a test sample (not shown) which is being transported on the endless belt 2 and each of the lamps 3a through 3d, 4a through 4d and 5a is 53 mm.

The irradiation intensity or output of each of the IR irradiation devices 3 and 4 is set by a product between voltage V and current A of a power supply (not shown), whereas, the irradiation intensity or output of the UV irradiation device 5 is set at the unit of 1% in a range between 35 and 100% of the output of the power supply (not shown). Since the rated maximum output of each of the IR irradiation devices 3 and 4 employed in the illustrated example is 1,000 W and the effective irradiation width of each of the IR lamps is 300 mm (i.e., 30 cm), its maximum output is 33.3 W/cm; on the other hand, since the lowest value adjustable by the power supply (not shown) is 225 W, its minimum output, as divided by the effective irradiation width, is 4.17 W/cm (or, approximately 4.2 W/cm). The maximum output (100% output) of the UV irradiation device 5 used in the illustrated example is 240 W/cm and its minimum output is its 35% or 84 W/cm.

Each of IR and UV irradiation time is determined by the transport velocity of endless belt 2 and the length of the opening in the transport direction A of each of IR and UV irradiation devices 3, 4 and 5. That is, in the present tests, since the minimum transport velocity is 1 m/min and the maximum transport velocity is 200 m/min, the IR irradiation time by the first row IR irradiation device 3 at the minimum transport velocity is 200 mm/1 m/min=20 cm/100 cm/60 sec=12 sec (maximum IR irradiation time). On the other hand, the IR irradiation time by the first row IR irradiation device 3 at the maximum transport velocity is 200 mm/200 m/min=20 cm/20000 cm/60 sec=0.06 sec (minimum IR irradiation time). Since the length of the opening in transport direction A of each of the second row IR irradiation device 4 and the UV irradiation device 5 is 200 mm so that it is the same as that of the first row IR irradiation device 3, their IR and UV irradiation times are the same as that of the first row IR irradiation device 3. However, in the test system illustrated in FIG. 1, since there are provided two IR irradiation devices, the total IR irradiation time is twice that of each IR irradiation device.

Incidentally, in the present verification, there are two verification modes, i.e., pre IR irradiation (namely, application of UV irradiation after application of IR irradiation to a test sample) and post IR irradiation (application of IR irradiation after application of UV irradiation to a test sample). In the case of the pre IR irradiation mode, the minimum transport velocity is set at 1 m/min and the maximum transport velocity is set at 40 m/min so that the minimum UV irradiation time under the condition is 200 mm/40 m/min=20 cm/400 cm/60 sec=0.3 sec. and the maximum UV irradiation time under the condition is 12 sec. In the system shown in FIG. 1, since the IR irradiation is twice the UV irradiation, the minimum IR irradiation time is 0.6 sec. and the maximum IR irradiation time is 24 sec.

Next, test samples used in the present tests will be described.

The test samples used include a PET film as a support and a photocurable resin composition having a film thickness of 10 micrometers formed on the support. As mentioned above, the present verification includes two modes, i.e., pre IR irradiation mode and post IR irradiation mode, and the support used in the pre IR irradiation mode has a thickness of 100 micrometers and the support used in the post IR irradiation mode has a thickness of 50 micrometers. The PET support is in A4 size and the PET support is placed on the endless belt 2 with the longitudinal direction of the PET support normal to the transport direction, so that the IR and UV irradiation is implemented with the width of 210 mm.

As for the making of the test samples, a photocurable resin composition solution was applied onto a PET support using a #14 bar coater and then, as a heating process, oven drying was carried out for one minute at a temperature of 60° C., thereby removing volatile components such as solvents from the solution. Incidentally, as the heating process in this case, it can, of course, be carried out by IR irradiation, hot air blowing, an electric heater or the like. In this manner, the test sample for use in the present verification is made such that, after applying a photocurable resin composition solution onto a PET support, a heating process is carried out to substantially remove the volatile components such as solvents so as to be sufficiently dry, thereby forming a film of photocurable resin composition having a thickness of 10 micrometers on the support. The test samples were made using different kinds of photocurable resin compositions, which can be classified crudely as the photo radical curing system or the photo cationic curing system. The specific photocurable resin compositions used in the present verification are as indicated below.

1. Photo Radical Curing System
    (1) Polyester Acrylate System
    Trimethylol propane-triacrylate (TMPTA: Aronix M-309 manufactured by Toagosei) 100 parts by weight as the photocurable resin composition and 1-Hydroxy-cyclohexyl-phenyl-ketone (manufactured by BASF, Irgacure 184) 5 parts by weight as the photo polymerization initiator were dissolved in methyl ethyl ketone 105 parts by weight to thereby prepare a 50% solid content solution.
    (2) Urethane Acrylate System (Urethane Acrylate System Resin Including Polyester Acrylate (TMPTA) as a Reactive Monomer)
    Urethane acrylate (Laromer R9029 manufactured by BASF) 60 parts by weight, TMPTA 40 parts by weight, Irgacure 184 as the photo polymerization initiator 5 parts by weight were dissolved in MEK 105 parts by weight to thereby prepare a 50% solid content solution.
    (3) Epoxy Acrylate System (Epoxy Acrylate System Resin Including Polyester Acrylate (TMPTA) as a Reactive Monomer)
    Epoxy acrylate (Denacol DA722 manufactured by Nagase ChemteX) 60 parts by weight, TMPTA 40 parts by weight, photo polymerization initiator Irgacure 184 5 parts by weight were dissolved in MEK 106 parts by weight to thereby prepare a 50% solid content solution.
2. Photo Cationic Curing System
    4-functional sorbitol glycidyl ether (Denacol EX612 manufactured by NagaseChmteX) 60 parts by weight as the photocurable resin composition, 2-functional epoxy cyclohexyl methyl-epoxy cyclohexane carboxylate (alicyclic epoxy: Cyracure UVR6110 manufactured by Dow Chemical Co.) 40 parts by weight, 50% aryl sulfonium hexafluorophosphate salt (diluted by solvent) 8 parts by weight as the photo polymerization initiator were dissolved in methyl ethyl ketone (MEK) 104 parts by weight to thereby prepare a 50% solid content solution.

Now, a description will be had as to a verification method for verifying the curing characteristics of a photocurable resin composition by applying IR irradiation prior to the application of UV irradiation using the IR/UV hybrid irradiation system of FIG. 1. In the first place, in the system of FIG. 1, since a test sample (not shown) transported as placed on the endless belt 2 is subjected to IR irradiation in the first place and then subjected to UV irradiation, its verification mode is the before-mentioned pre IR irradiation mode. Incidentally, in the system of FIG. 1, two IR irradiation devices 3 and 4 are provided, but it goes without saying that an arbitrary number of IR irradiation devices may be provided.

In the present verification method, in the first place, a control (UV cured sample) is made as a standard for comparison by applying UV irradiation only to at least one test sample without applying IR irradiation in a manner similar to the normal UV curing to thereby have the photocurable resin composition of the test sample cured. Then, at least one another test sample is subjected to IR irradiation first and then to UV irradiation to have the photocurable resin composition of the test sample cured (IR+UV cured sample). Then, the scratch resistance characteristic test is run for the UV cured sample and also for the IR+UV cured sample and the degrees of scratch for them are compared. As the scratch resistance characteristic test, manually and/or using a scratch tester (manufactured by Shinto Kagaku K.K.), steel wool (Bon Star #0000) was reciprocated ten times over the surface of the cured photocurable resin composition of the test sample under the load of 500 g/9 $cm^2$, and the scratch characteristic on the surface was observed visually and/or measured using a haze measuring unit (manufactured by JASCO International Co.) The UV cured sample and the IR+UV cured sample to be compared as to their scratch resistance characteristics were subjected to the same UV irradiation output and UV irradiation time.

Figure 2:
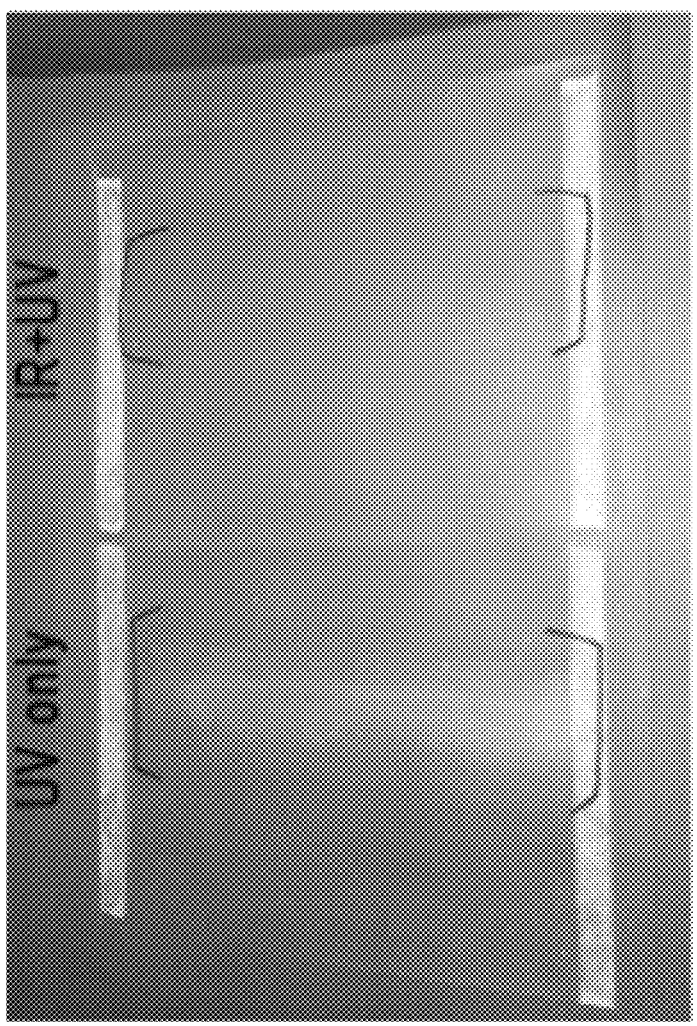
FIG. 2 is a photo showing an example of a result of scratch resistance test.

FIG. 2 is a photo showing an example of comparison between the UV cured sample and the IR+UV cured sample which have gone through the scratch resistance characteristic test. For the example of FIG. 2, the UV irradiation condition includes the UV output of 240 W/cm and the UV irradiation time of 1.2 sec., and the IR irradiation condition includes the IR output of 33.3 W/cm and the IR irradiation time of 1.2 sec. The transit time from the IR irradiation to the UV irradiation is 1.2 sec. The sample at the left side in FIG. 2 is the UV cured sample and the sample at the right side is the IR+UV cured sample. As can be seen from the photo of FIG. 2, the surface of the UV cured sample at the left side, which was not subjected to the pre IR irradiation, has significant scratch marks to thereby become cloudy due to the scratch resistance characteristic test. On the other hand, it can be seen that the surface of the IR+UV cured sample at the right-hand side, which was subjected to the pre IR irradiation, is substantially free of observable scratches due to the scratch resistant characteristic test.

Next, it will be described in detail as to the results of the scratch resistance characteristic tests run for each of the above-mentioned various kinds of photocurable resin compositions.

Embodiment 1

Figure 3A:
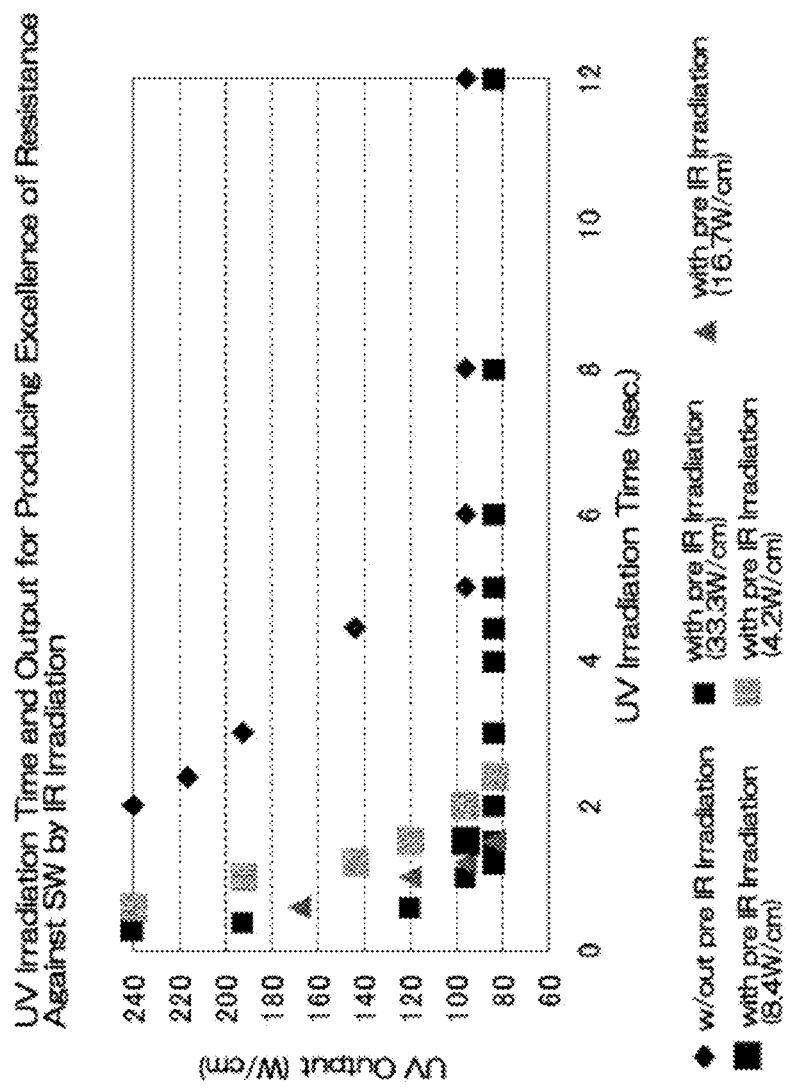
Figure 3B:
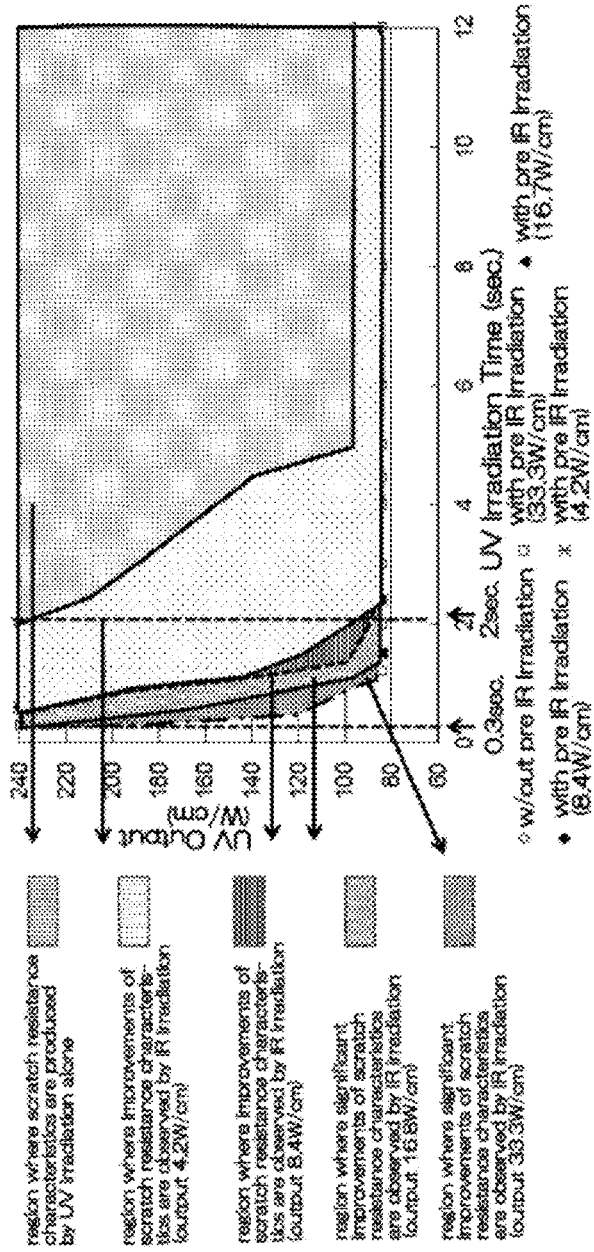

The results obtained for the case using the polyester acrylate system among the above-mentioned photo radical curing system as the photocurable resin composition are shown in FIG. 3A and FIG. 3B. FIG. 3A is a plot of the test results and FIG. 3B is a region diagram created based on the plot of FIG. 3A.

In this test, with the IR output of IR irradiation devices 3 and 4 set at any one of zero, 4.2 W/cm, 8.4 W/cm, 16.7 W/cm, and 33.3 W/cm, the curing processes were carried out with the transport velocity of endless belt 2 placed thereon a test sample varied from 1 m/min to 40 m/min in a stepwise fashion and the UV irradiation time varied from 0.3 sec. to 12 sec. in a stepwise fashion. Thus, in FIG. 3A, the results of the curing processes are plotted in a graph whose ordinate indicates UV output (W/cm) and whose abscissa indicates UV irradiation time (sec.) with the IR output as a parameter. FIG. 3B indicates the regions, in which the photocurable resin compositions produce appropriate scratch resistance characteristics due to the UV irradiation, obtained by connecting the test results for the same test conditions in the plot of FIG. 3A.

First, in the graph of FIG. 3B, a region exhibiting a proper scratch resistance characteristic in the case of absence of pre IR irradiation (i.e., prior art curing process with UV irradiation alone) indicates the fact that the UV output must be equal to or larger than about 95 W/cm, and, moreover, indicates the fact that the UV irradiation time must be equal to or longer than 5 seconds for the case of 95 W/cm. The maximum value of the UV output under the instant test conditions is 240 W/cm and the UV irradiation time under the conditions is 2 seconds. However, as the UV output increases, the corresponding minimum UV irradiation time gradually decreases, so that the UV irradiation time is expected to become shorter than 2 seconds if use is made of UV outputs exceeding 240 W/cm.

On the other hand, it is shown that, in the case when the pre IR irradiation is set at the minimum output of 4.2 W/cm, a proper scratch resistant characteristic is exhibited at 84 W/cm which is lower than the above-mentioned UV output of 95 W/cm, and it is shown that the UV irradiation time must be about 2.2 seconds at this UV output. Incidentally, 84 W/cm is nothing but the minimum output which can be produced by the UV irradiation device 5 of the present system 1. It is expected that a proper scratch resistance characteristic can be obtained by applying the pre IR irradiation even at UV outputs lower than this, but the minimum UV irradiation time required thereby is expected to become longer.

Furthermore, in FIG. 3B, as the IR irradiation output is increased in a stepwise fashion, the region, in which proper scratch resistant characteristics can be obtained, is shown to gradually shift toward shorter UV irradiation times. In particular, it is shown that, in the case of maximum IR output of 33.3 W/cm, the minimum UV irradiation time required at the minimum UV output of 84 W/cm is about 1 second, whereas, the minimum UV irradiation time required at the maximum UV irradiation output of 240 W/cm is 0.3 seconds.

From the above, it can be seen that based on the present invention, with the application of IR irradiation prior to the application of UV irradiation to a photocurable resin composition, by applying the UV irradiation to the photocurable resin composition over a UV irradiation time shorter than the UV irradiation time which is necessary for the photocurable resin composition to reach a predetermined degree of curing by the UV irradiation alone, a degree of curing which is equal to or greater than the predetermined degree of curing is produced. The predetermined degree of curing refers to the fact that the scratch resistance characteristic of the surface of the photocurable resin composition has reached a proper level. For example, it signifies the fact that when the scratch resistance characteristic tests are conducted to the surfaces of cured photocurable resin compositions manually or by a scratch resistance tester, the absence of scratches on the surfaces can be observed visually and/or desired haze measured values (%) are obtained when haze values are measured by a haze tester. Incidentally, the region in which the scratch resistance characteristics are exhibited with the UV irradiation alone in FIG. 3B is a region for which the absence of scratches can be visually observed when the scratch resistance test is run for a test sample which has been cured with the UV irradiation alone. And when it is compared with a test sample which is cured with the application of the pre IR irradiation, both are approximately the same as far as whether or not scratches are present. However, when the pre IR irradiation is applied, the surface of a cured test sample is much more slippery in feeling and there is a tendency in that the resistance of the surface when scrubbed with the steel wool is lower and thus more slippery. As a result, although the evaluation is the same for the test sample cured by the UV irradiation alone and for the test sample to which the pre IR irradiation is applied as far as the absence of scratches is concerned, it is believed that the test sample to which the pre IR irradiation is applied is, in fact, enhanced further in the degree of curing.

Accordingly, in accordance with the present invention, by applying the IR irradiation prior to the application of the UV irradiation, a photocurable resin composition can be properly cured by applying the UV irradiation over a shorter UV irradiation time which is impossible for the UV irradiation alone. That is, the curing process of a photocurable resin composition can be implemented more expeditiously and yet a more enhanced degree of curing can be achieved.

Figures 4, 5:
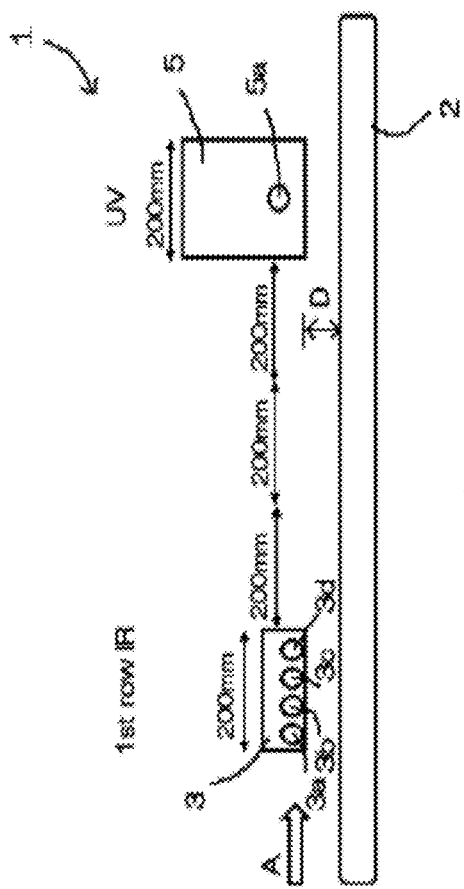
FIG. 4 is a schematic illustration of an IR/UV hybrid irradiation system which has been used to investigate how the scratch resistance characteristics are affected by the pre IR irradiation as a function of time from the IR irradiation to the UV irradiation.
FIG. 5 is a table showing the test results obtained by using the system of FIG. 4.

Next, as shown in FIG. 4, the test sample curing process was implemented using only the first row IR irradiation device 3 and the UV irradiation device 5 separated away 600 mm therefrom while keeping the second IR irradiation device 4 inactive in the system 1 of FIG. 1. With the IR output maintained at 33.3 W/cm and the UV output maintained at 84 W/cm, the transport velocity was varied gradually to vary the transit time from the IR irradiation device 3 to the UV irradiation device 5 so as to verify the fact that how soon the UV irradiation should be applied after the application of the IR irradiation. The results are shown in FIG. 5. From these results, it can be seen that the UV irradiation should be applied within 14 seconds after the application of the IR irradiation. Incidentally, taking the results shown in FIG. 3A and FIG. 3B into consideration, the influences due to changes in level of the IR and UV outputs are expected to be negligible.

Embodiment 2

Figure 6A:
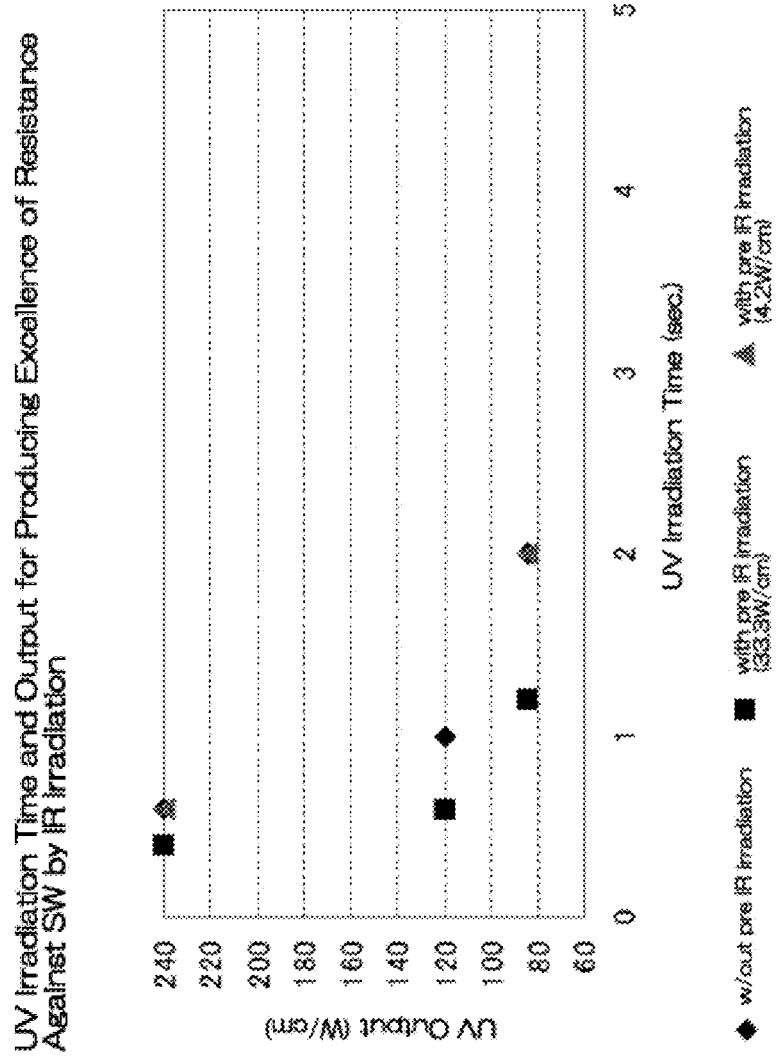
Figure 6B:
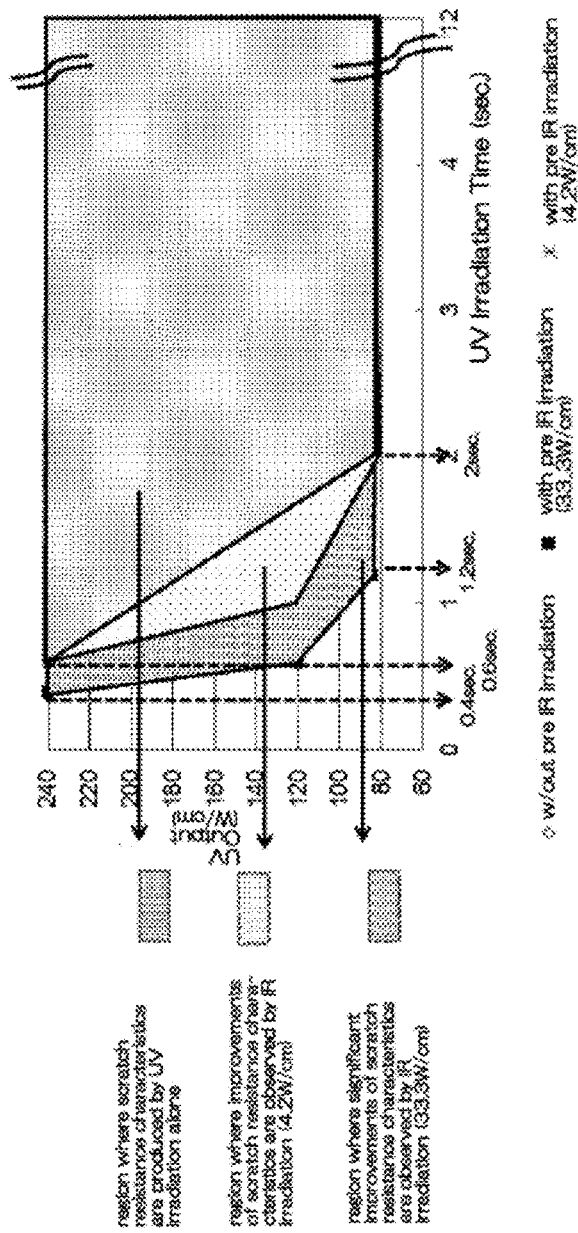

The results obtained for the case using the urethane acrylate system among the above-mentioned photo radical curing system as the photocurable resin composition are shown in FIG. 6A and FIG. 6B. In this case also, the curing process was implemented using the hybrid-system of FIG. 1. FIG. 6A is a plot of the test results and FIG. 6B is a region diagram created based on the plot of FIG. 6A. As is clear from the graphs of FIG. 6A and FIG. 6B, in general, it can be seen that this case also shows a curing tendency similar to that of embodiment 1.

However, as different from embodiment 1, in this embodiment, even without the pre IR irradiation, it is shown that the scratch resistance characteristics are exhibited even at 84 W/cm, which is the minimum output of UV irradiation employed in the present verification, and the minimum value of UV irradiation time thereby is 2 seconds. It is also shown that the minimum UV irradiation time, which is necessary to produce the scratch resistance characteristics due to the application of the pre IR irradiation, becomes much shorter as compared with the case in which the pre IR irradiation is not applied. For example, with the IR output at 33.3 W/cm, which is the maximum used in the present test, when the UV output is at the minimum of 84 W/cm, the minimum required UV irradiation time is 1.2 seconds; on the other hand, when the UV output is at the maximum of 240 W/cm, the minimum required UV irradiation time is 0.4 seconds (or 0.6 seconds without the pre IR irradiation).

Therefore, from the graphs of FIG. 6A and FIG. 6B, in the case of embodiment 2 also, it is shown that by applying the pre IR irradiation, the UV irradiation time can be shortened so that the process speed can be increased.

Incidentally, the above-described minimum and maximum values for the IR and UV outputs are the minimum and maximum values in the hybrid system of FIG. 1 used in the present verification so that it should be kept in mind that they are not the minimum and maximum values that are necessary to produce the scratch resistance characteristics according to the hybrid curing process of the present invention. The functional effects of the present invention are expected to be exhibited even at an output range exceeding beyond the minimum and maximum values of the IR and UV outputs. This holds true not only for the present embodiment, but also for the other embodiments.

Embodiment 3

Figure 7A:
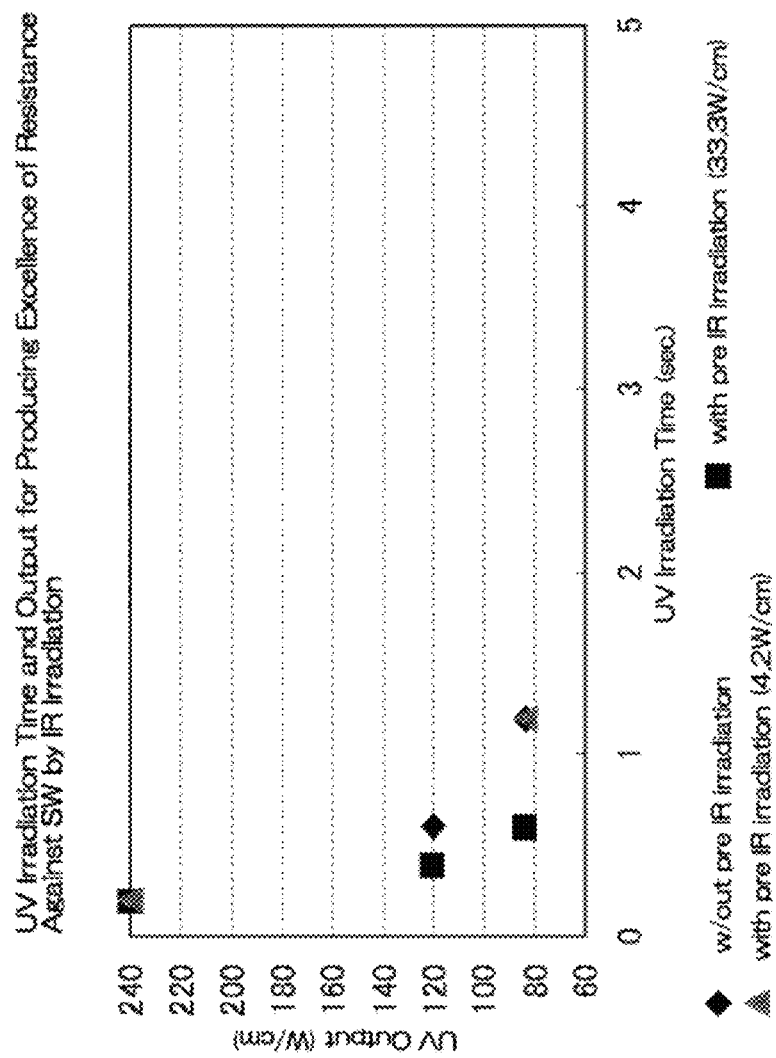
Figure 7B:
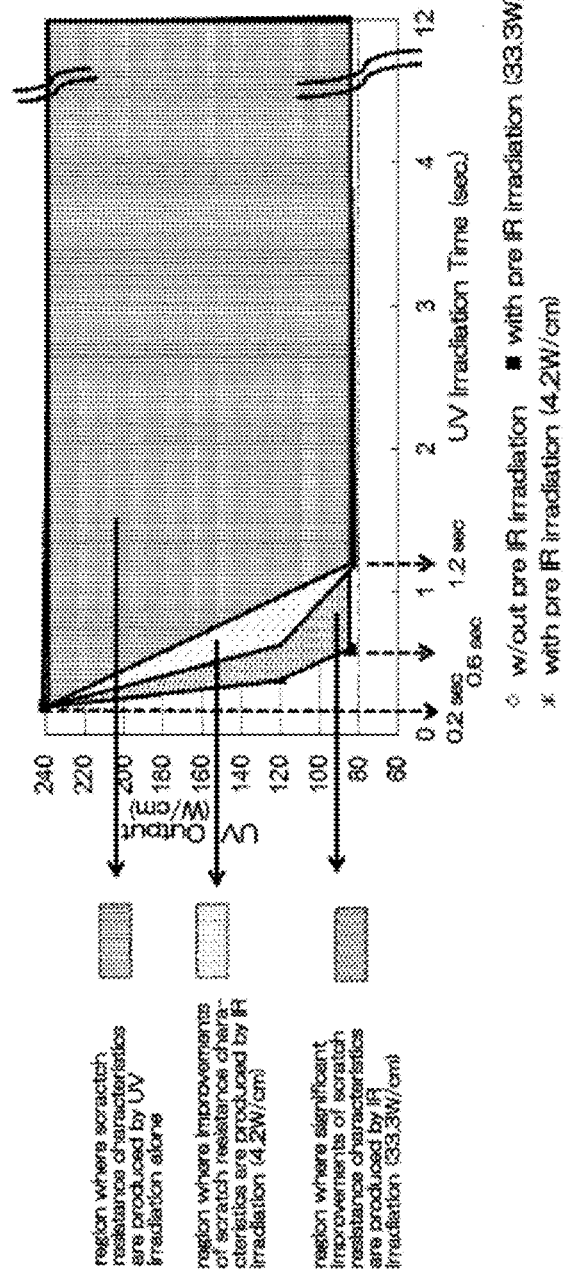

The results obtained for the case using the epoxy acrylate system among the above-mentioned photo radical curing system as the photocurable resin composition are shown in FIG. 7A and FIG. 7B. In this case also, the curing process was implemented using the hybrid-system of FIG. 1. FIG. 7A is a plot of the test results and FIG. 7B is a region diagram created based on the plot of FIG. 7A. As is clear from the graphs of FIG. 7A and FIG. 7B, in general, it can be seen that this case also shows a curing tendency similar to those of embodiments 1 and 2.

However, when compared with the case of embodiment 2, in this embodiment, it is shown that, without the pre IR irradiation, the minimum value of the UV irradiation time for producing the scratch resistance characteristics at 84 W/cm, which is the minimum output of the UV irradiation employed in this verification, is further reduced to be 1.2 second (vs. 2 seconds in embodiment 2). And, it is also shown that, with the UV output at its maximum value of 240 W/cm or lower, the minimum UV irradiation time which is necessary to produce the scratch resistance characteristics by applying the pre IR irradiation becomes further shortened as compared with the case in which the pre IR irradiation is not applied. For example, in the case when the maximum IR output used in this test is 33.3 W/cm, for the UV output at its minimum of 84 W/cm, the minimum required UV irradiation time is 0.6 seconds (vs. 1.2 seconds in embodiment 2), and for the UV output at its maximum of 240 W/cm, the minimum required UV irradiation time is 0.2 seconds (vs. 0.4 seconds in embodiment 2). However, with the UV output at its maximum value of 240 W/cm, the minimum required UV irradiation time which is necessary for the production of scratch resistance characteristics is approximately the same (approximately 0.2 seconds) for both of the cases with and without the application of the pre IR irradiation. It is to be noted here that, as described before, in a simple comparison of scratch resistance characteristics only in terms of the presence or absence of scratches, the minimum UV irradiation time is the same (i.e., 0.2 seconds) for both of the cases with and without the pre IR irradiation, but a more enhanced degree of curing can be obtained by applying the pre IR irradiation as compared with the case without the application of the pre IR irradiation.

Thus, from FIG. 7A and FIG. 7B, it is shown that also in the case of embodiment 3, the UV irradiation time can be shortened by applying the pre IR irradiation, thereby expediting the process speed.

Embodiment 4

Figure 8A:
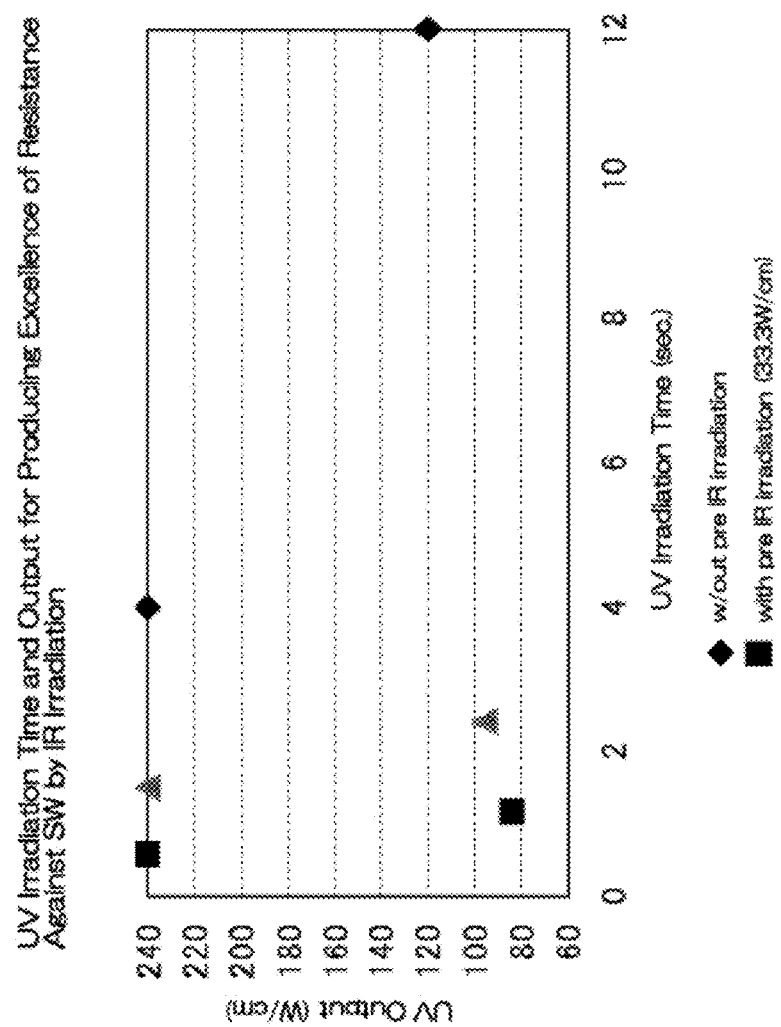
Figure 8B:
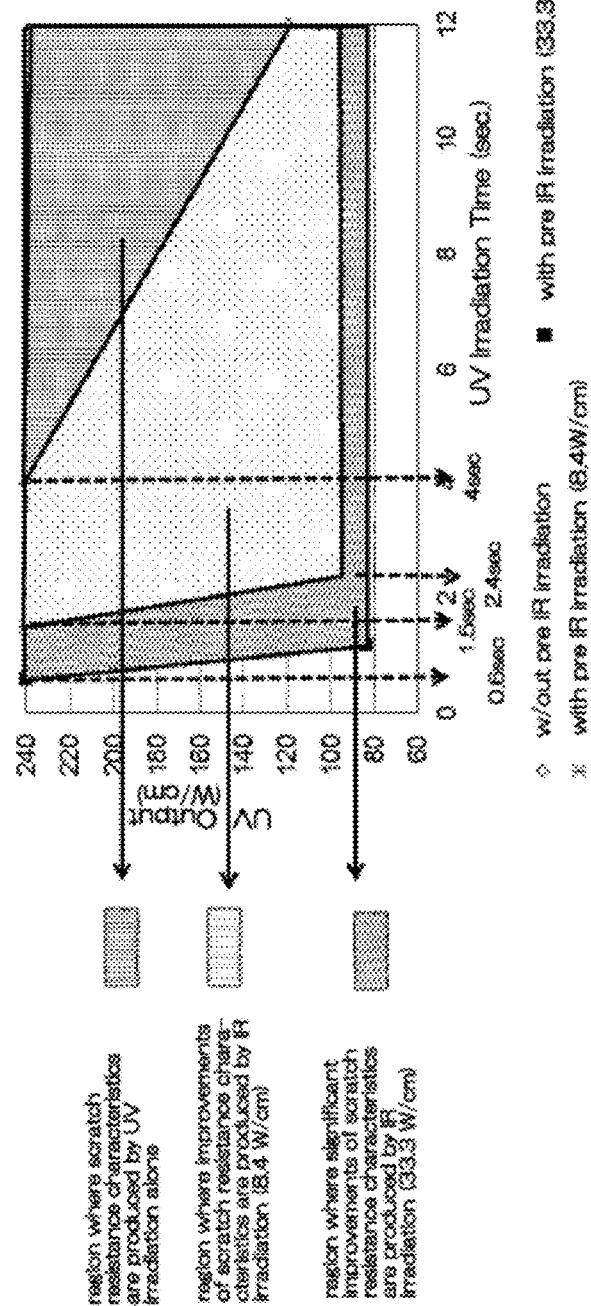

This is the case in which use is made of the polyester acrylate system among the photo radical curing system of the above-described embodiment 1 as a photocurable resin composition and use is made of Lucirin TPO (trimethyl benzoil-diphenyl-phosphin oxide manufactured by BASF) in place of Irgacure 184 as the photo polymerization initiator. And the test results are shown in FIG. 8A and FIG. 8B. FIG. 8A is a plot of the test results and FIG. 8B is a region diagram created based on the plot of FIG. 8A.

As is clear by comparing the graphs of FIG. 8A and FIG. 8B with the graphs of FIG. 3A and FIG. 3B for embodiment 1, it can be seen that, in general, similar improvements in the scratch resistance characteristics due to the application of the pre IR irradiation can be obtained even if the photo polymerization initiator is different. However, as is shown in the graphs of FIG. 8A and FIG. 8B, as compared with embodiment 1, in embodiment 4, it is understood that if the pre IR irradiation is not applied (i.e., UV irradiation alone), in order to produce the scratch resistance characteristics, the minimum required UV irradiation time becomes even longer and the larger UV output is required. In other words, if the pre IR irradiation is not applied, at 84 W/cm, which is the minimum output in the present verification, the scratch resistance characteristics are not produced even if the UV irradiation is applied for 12 seconds, which is the maximum UV irradiation time in the present verification. In the case of UV irradiation for 12 seconds, which is the maximum UV irradiation time in the present verification, it is seen that the scratch resistance characteristics are produced if the UV output is 120 W/cm or larger. Furthermore, if the pre IR irradiation is not applied, it is seen that the minimum required UV irradiation time is 4 seconds (approximately 2 seconds for embodiment 1) even at the maximum UV output (240 W/cm) in the present verification.

On the other hand, in this embodiment 4, the minimum UV irradiation time, which is necessary for the production of the scratch resistance characteristics, is significantly reduced by the application of the pre IR irradiation. For example, it is shown that if the IR output is 8.4 W/cm, which is the minimum value in the present verification, the UV output is required to be approximately 95 W/cm or above in order to produce the scratch resistance characteristics. And, in the case when the UV output is approximately 95 W/cm, the minimum UV irradiation time required to produce the scratch resistance characteristics is reduced to 2.4 seconds, whereas, in the case when the UV output is at its maximum of 240 W/cm, it is reduced to 1.5 seconds. Moreover, in the case when the IR output is at 33.3 W/cm, which is the maximum value in the present verification, if the UV output is at 84 W/cm, it is reduced to 1.2 seconds, whereas, if the UV output is at 240 W/cm, it is reduced to 0.6 seconds. Thus, when compared with embodiment 1, it can be seen that the reduction effects of the minimum required UV irradiation time due to the application of the pre IR irradiation based on the present invention are more significant in embodiment 4.

Embodiment 5

Figure 9A:
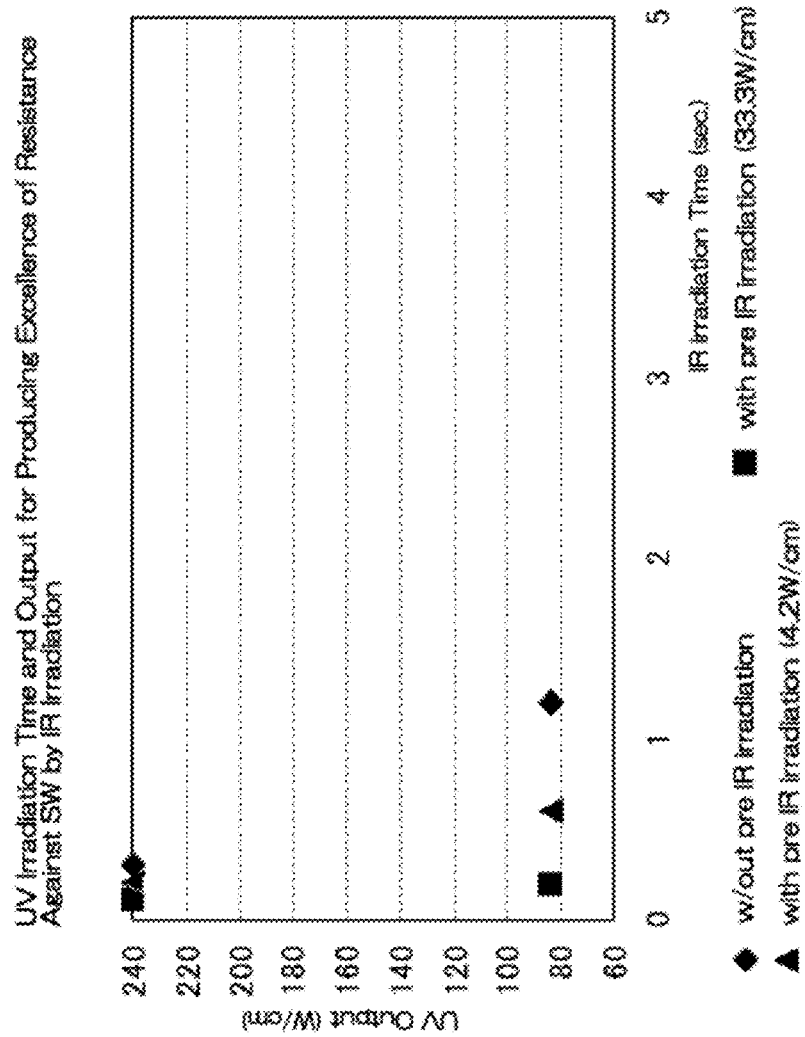
Figure 9B:
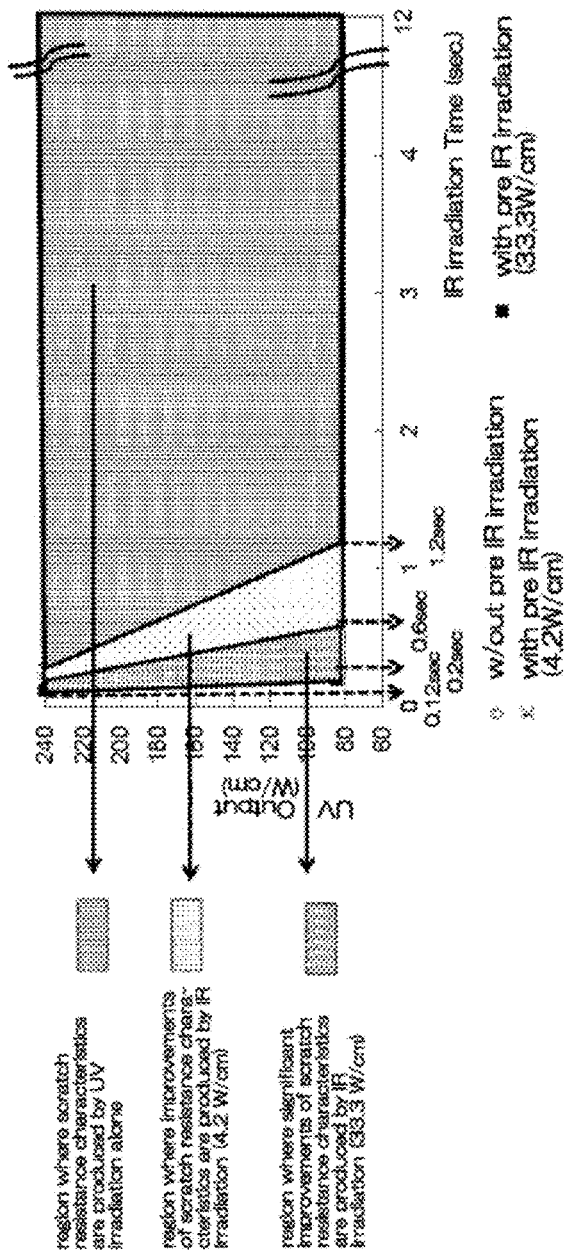

The results obtained for the case using the above-mentioned photo cationic curing system as the photocurable resin composition are shown in FIG. 9A and FIG. 9B. FIG. 9A is a plot of the test results and FIG. 9B is a region diagram created based on the plot of FIG. 9A. In this case also, the curing process was implemented using the hybrid-system of FIG. 1. As is clear from the graphs of FIG. 9A and FIG. 9B, in general, it can be seen that this case also shows a curing tendency similar to that of embodiment 1.

However, as different from the case of embodiment 1, it is shown that the scratch resistant characteristics in this case were produced even at 84 W/cm, which is the minimum output of the UV irradiation employed in this verification, without the pre IR irradiation, whereby the minimum value of the UV irradiation time is 1.2 seconds and the minimum required UV irradiation time at 240 W/cm, which is the maximum output of the UV irradiation, is 0.3 seconds. It is also shown that the minimum UV irradiation time required to produce the scratch resistance characteristics by applying the pre IR irradiation becomes much shorter as compared with the case in which the pre IR irradiation is not applied. For example, in the case when the IR output is at 33.3 W/cm, which is the maximum output employed in this test, if the UV output is at its minimum of 84 W/cm, the minimum required UV irradiation time is 0.2 seconds, whereas, if the UV output is at its maximum of 240 W/cm, the minimum required UV irradiation time is 0.12 seconds.

Thus, from the graphs of FIG. 9A and FIG. 9B, it is shown that the UV irradiation time can be shortened by applying the pre IR irradiation so that the process speed can be increased also in the case of embodiment 5.

As described before, the UV curing reaction is a three dimensional cross-linking reaction due to the photo polymerization initiator, and a cross-link network is created through a growth reaction from the polymerization initiation active species (polymerization initiation points) produced from the photo polymerization initiator by UV irradiation. Thus, for example, in the case of the photo radical curing system using trifunctional polyester acrylate (TMPTA) as a curing resin, the curing reaction proceeds with the acryl groups of TMPTA undergoing the addition polymerization in a chain reaction due to the radicals. As a result, the cross-link density of a cured film depends on the number of polymerization initiation points produced by UV irradiation and the reaction rate of the acryl group double bond of TMPTA. On the other hand, in the case of photo cationic curing system, the curing reaction proceeds based on the ring-opening polymerization of epoxy group.

Incidentally, since the scratch resistance characteristics of a cured film depend on the cross-link density at the film surface, in the case of producing the excellent nature of scratch resistance characteristics due to the IR irradiation prior to UV irradiation, changes in the amount of polymerization initiation species due to IR irradiation (i.e., photo polymerization initiator decomposition efficiency due to UV irradiation) and the acryl group reaction rate should be examined.

Figure 10:
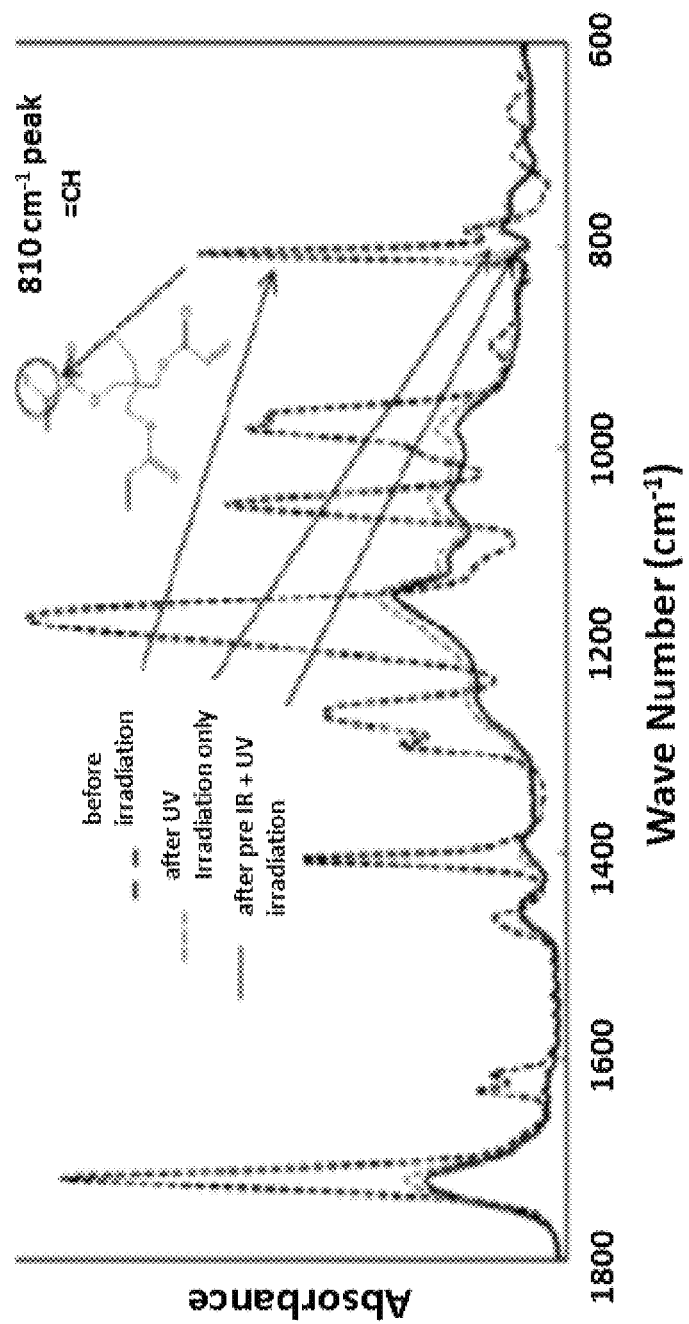
FIG. 10 is a graph showing IR absorption spectrum before and after the UV irradiation.

Under the circumstances, the effects of pre IR irradiation to the acryl double bond conversion (reaction rate) was studied by measuring the amount of remaining acryl group double bonds after UV irradiation according to the Fourier transform infrared spectroscopy (FTIR) and its results are shown in FIG. 10. FIG. 10 shows changes in IR absorption spectra before and after UV irradiation, including (1) spectra prior to UV irradiation, (2) spectra obtained by UV irradiation (output: 240 W/cm, irradiation time: 1.2 seconds) alone, and (3) spectra obtained by pre IR irradiation (output: 240 W/cm, irradiation time: 1.2 seconds) and UV irradiation (output: 240 W/cm, irradiation time: 1.2 seconds, and 1.2 seconds after the pre IR irradiation). As shown in FIG. 10, the absorption based on acryl group C—H deformation vibration exists in the neighborhood of 810 cm-r and the absorption in this wave number region decreases as the curing proceeds due to UV irradiation. The reaction rate was calculated by quantifying this amount of reduction (i.e., absorption peak area) using the absorption in the neighborhood of 1740 $cm^{-1}$, which is not affected by the UV irradiation, as an internal reference. Incidentally, while setting the IR and UV outputs at 33.3 W/cm and 240 W/cm, respectively, the double bond conversion was determined for the irradiation time of each energy line. The results of the conversion of acryl double bonds (reaction rate of acryl group) thus obtained are shown in FIG. 11. As is clear from the table of FIG. 11, with the application of IR irradiation prior to the application of UV irradiation, a clear increasing tendency in the double bond conversion is seen and thus it is understood that the reaction rate of acryl groups increases.

Figure 12:
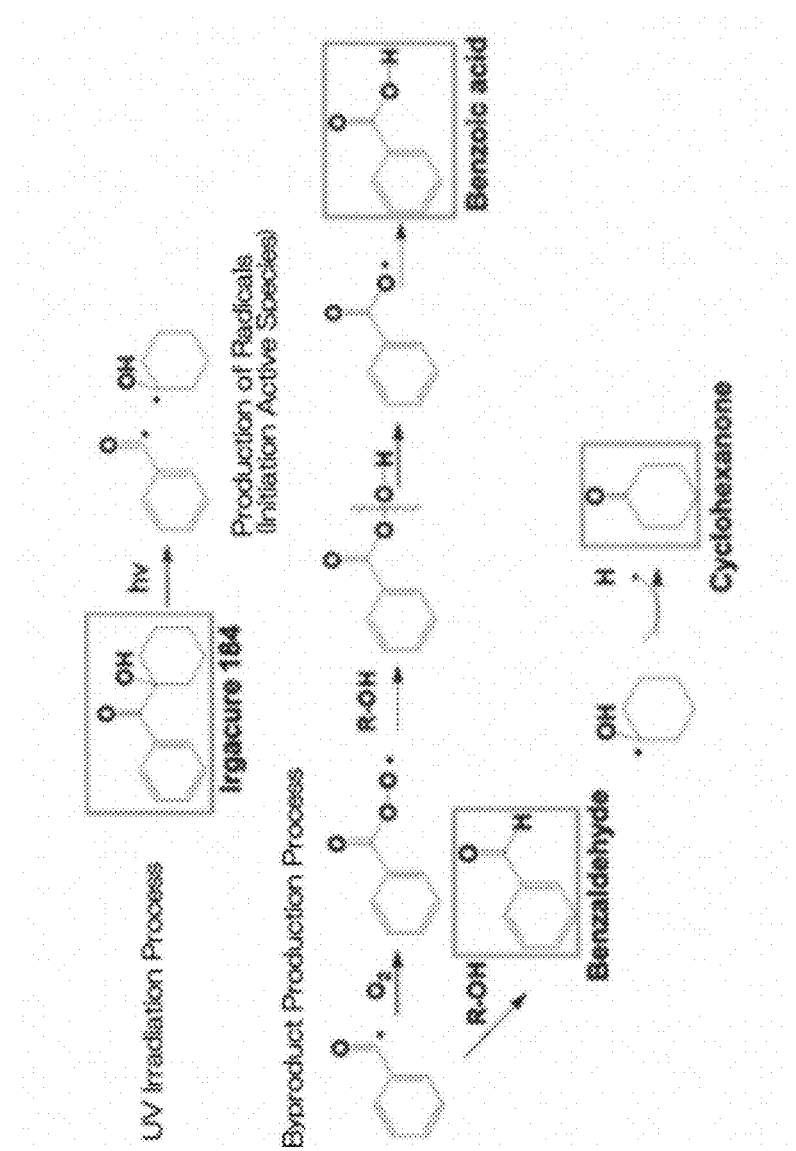
FIG. 12 is a schematic illustrating a production process of byproducts due to UV irradiation.

Next, in order to confirm the fact that the decomposition efficiency (radical production efficiency) of photo polymerization initiators increases by applying the IR irradiation prior to the application of the UV irradiation as compared with the case of UV irradiation alone, cured films were subjected to GC-MS (gas chromatography-mass spectrometry). As shown in FIG. 12, Irgacure 184, which was used as a photo polymerization initiator in the above-described embodiments, undergoes the cleavage reaction due to UV irradiation to thereby produce radicals, but those radicals that did not contribute to the initiation of polymerization become various decomposition products. Among those decomposition products, cyclohexane and benzaldehyde are easy to evaporate and thus often removed from the cured film, whereas, benzoic acid is hard to evaporate and thus tends to remain in the cured film. Accordingly, it is possible to evaluate the magnitude of the decomposition efficiency by comparing a ratio between the unreacted Irgacure 184 remaining in the cured film and the benzoic acid, which is a byproduct from the decomposition products. This is because this ratio should remain at constant if the decomposition efficiency of the photo polymerization initiator is the same.

Figure 13:
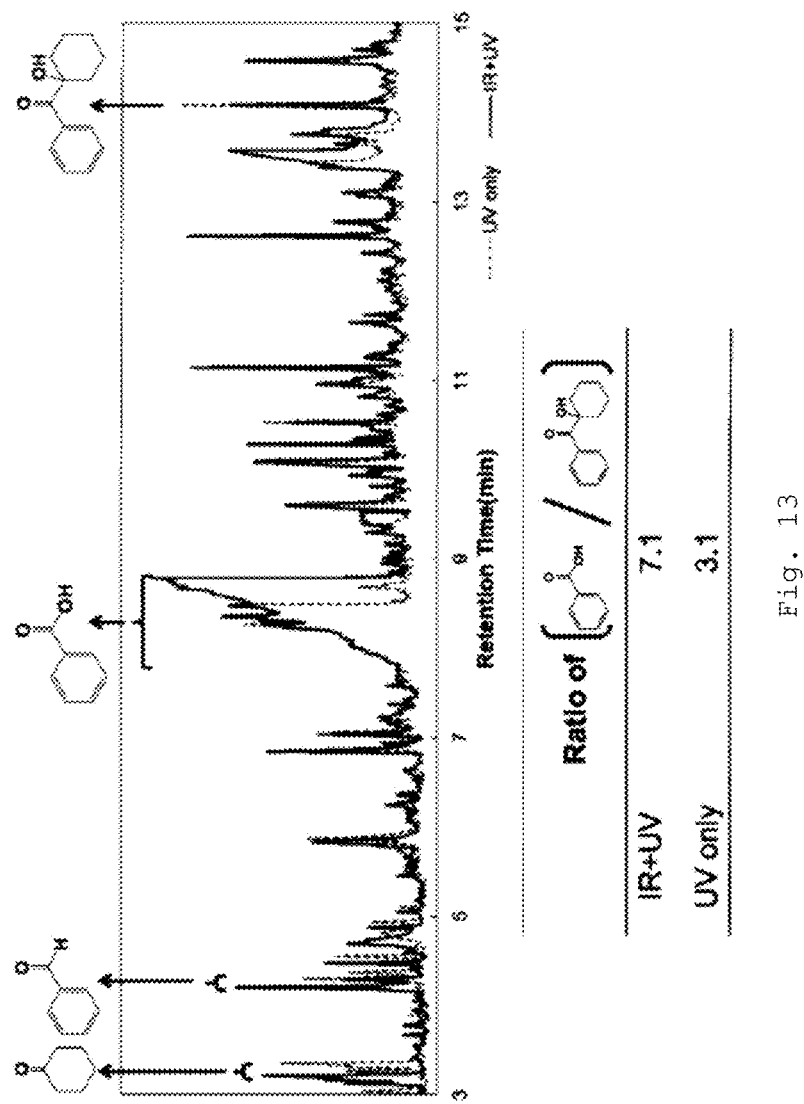
FIG. 13 is a graph showing the results of measurements by GC-MS of initiator decomposition products upon UV irradiation.

FIG. 13 shows the results of measurements by GC-MS for a cured film (dotted line in the figure) obtained by applying UV irradiation (output: 240 W/cm, irradiation time: 1.2 seconds) to TMPTA containing 5% of Irgacure 184 and for a cured film (solid line in the figure) obtained by applying IR irradiation (output 33.3 W/cm, irradiation time: 1.2 seconds) prior to the application of UV irradiation for the same sample. Normally, the amount of decomposition of the photo polymerization initiator depends on the amount of absorption energy of the photo polymerization initiator and it should remain at constant under the same UV irradiation conditions (in this case, output: 240 W/cm, 1.2 seconds), but because of the application of the IR irradiation prior to the UV irradiation, the amount of production of cyclohexane, benzaldehyde, and benzoic acid, which are the decomposition products of the photo polymerization initiator, increases (i.e., the signal area increases). By comparing the amount ratio between benzoic acid and the unreacted, remaining photo polymerization initiator, it is seen that the amount of the unreacted, remaining photo polymerization initiator decreases and the amount of production of benzoic acid increases by applying the IR irradiation prior to the UV irradiation. It is therefore understood that the decomposition efficiency of the photo polymerization initiator increases by applying the IR irradiation prior to the UV irradiation.

As shown in FIG. 13, the decomposition efficiency of Irgacure 184 increases by applying the IR irradiation prior to the UV irradiation. The results of the examination conducted to determine how such an increase in the decomposition efficiency of the photo polymerization initiator affects the polymerization of acryl groups which occurs subsequently will be described below.

Figure 14:
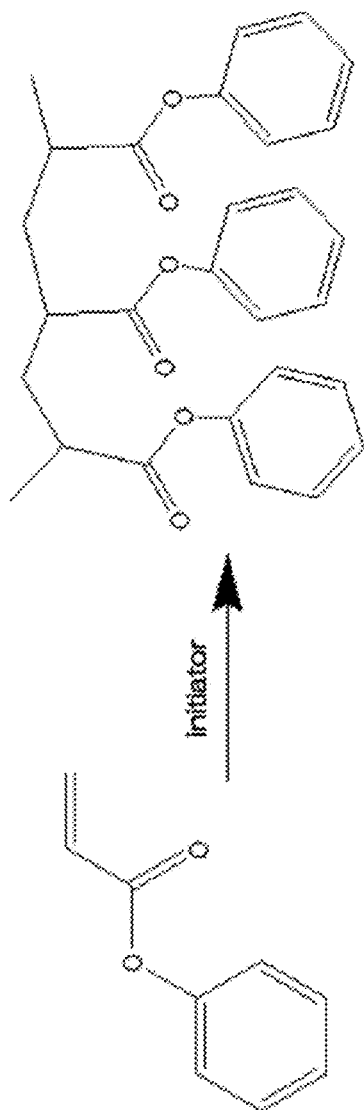
FIG. 14 is a schematic showing a process in which a solvent soluble chain polymer is obtained.
Figure 15:
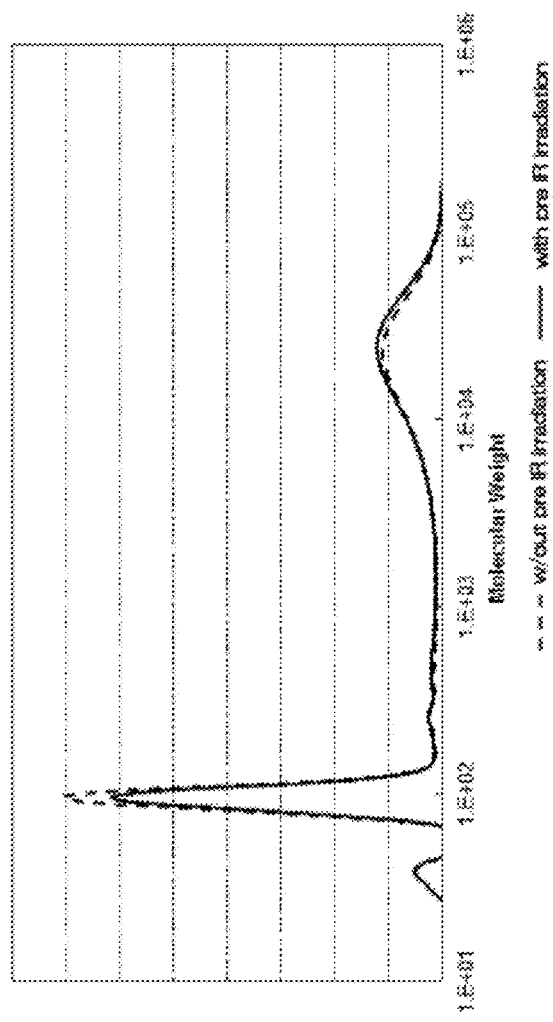
FIG. 15 is a graph showing a chromatogram of a polymer produced by UV irradiation.

In the case of a multifunctional acrylate such as TMPTA, which is used for normal UV curing reaction, the cross-linking reaction takes place by the application of UV irradiation and a cured film becomes insoluble to a solvent so that it becomes difficult to conduct an analysis of products by an analyzer such as chromatograms. On the other hand, if a photo initiation polymerization is implemented using a monofunctional polymer such as benzyl acrylate as shown in FIG. 14, a chain polymer soluble to a solvent can be obtained as the polymerization proceeds. By utilizing such a property, benzyl acrylate containing 5% of Irgacure 184 was subjected to UV irradiation and the resulting product polymer was analyzed by GPC (Gel Permeation Chromatography). As an example, a chromatogram for the product obtained by the UV output of 240 W/cm and the irradiation time of 1.2 seconds is shown in FIG. 15. The IR irradiation conditions for the case of IR irradiation prior to the UV irradiation included the output of 33.3 W/cm and the irradiation time of 2.4 seconds. From this figure, it is seen that the peak of product polymer has shifted to the high molecular weight side by applying the IR irradiation prior to the UV irradiation.

Figure 16:
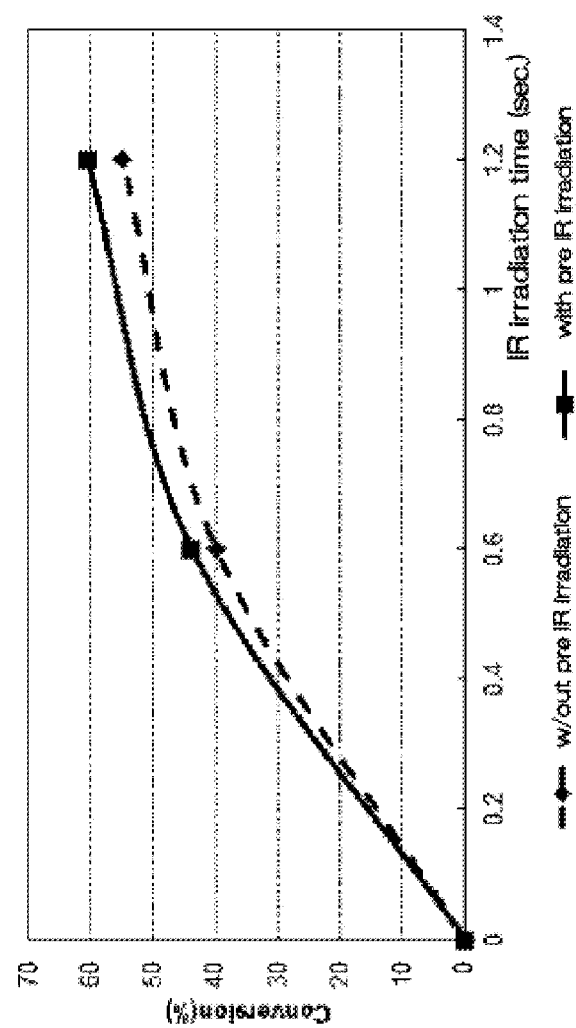
FIG. 16 is a graph showing variations in conversion rate from monomers to polymers.

Variations of conversion from monomers to polymers as a function of UV irradiation time for the case of applying the IR irradiation (output: 33.3 W/cm) prior to the UV irradiation and also for the case of not applying the IR irradiation prior to the UV irradiation with the UV output fixed at 240 W/cm have been calculated from area values of the remaining monomers and the product polymers on the chromatogram of FIG. 15. The results thus obtained are shown in FIG. 16. From this figure, it is seen that the conversion rate from monomers to polymers increases due to the application of the IR irradiation prior to the UV irradiation. This indicates that such a result does not conflict with the fact of increase in the decomposition efficiency of Irgacure 184 observed by GC-MS measurements and also the fact of increase in the conversion rate of acryl groups observed by FTIR by applying the IR irradiation prior to the UV irradiation.

Figures 17, 18:
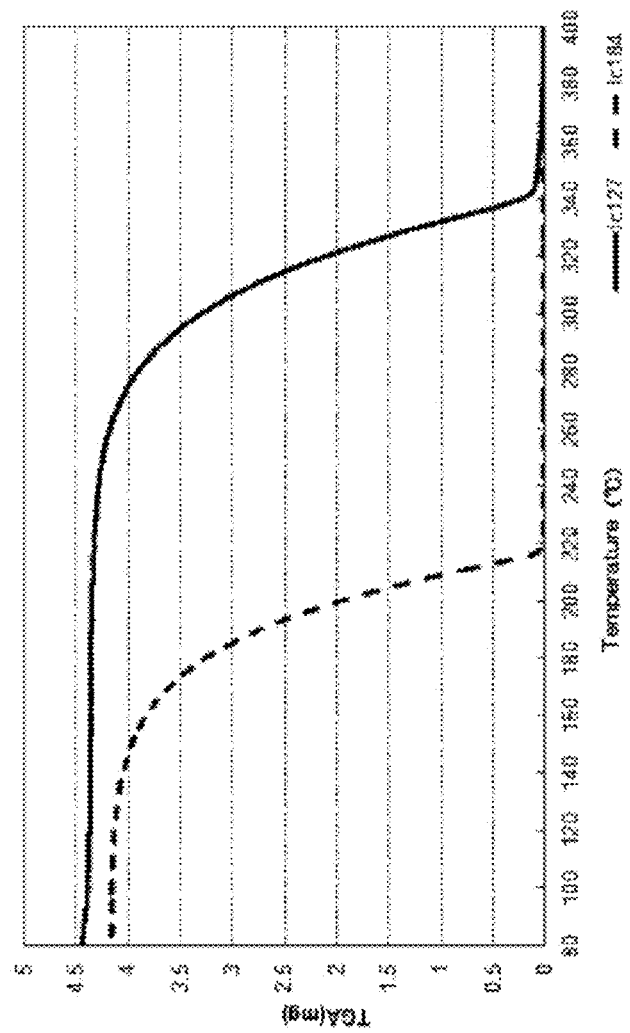
FIG. 17 is a table showing the results of GPC analysis of a polymer obtained by UV irradiation.
FIG. 18 is a graph showing weight reduction curves as a function of temperature for Irgacure 184 and Irgacure 127, respectively.

Polymers obtained by applying the UV irradiation for 0.6 seconds and 1.2 seconds were analyzed by GPC and its results are shown in FIG. 17. From these results, it is seen that both of a number average molecular weight and a weight average molecular weight defined by the following equations (1) and (2), respectively, increase due to the application of the IR irradiation prior to the UV irradiation as compared with the case with the UV irradiation alone. Normally, when the decomposition efficiency of photo polymerization initiators increases and the density of the polymerization initiation radicals thus produced increases, both of the number average molecular weight and the weight average molecular weight should decrease theoretically. However, in the present invention, both of these increase, and it is seen that a molecular weight distribution defined by Mw/Mn hardly differs from that of the case with the UV irradiation alone. Based on these findings, it is believed that, by applying the IR irradiation prior to the UV irradiation, although the polymerization mechanism itself remains unchanged, not only the photo polymerization initiators but also the monomers become activated, thereby increasing the overall polymerization rate.

Number Average Molecular Weight $Mn$=total weight in a system/number of molecules in a system=$\Sigma MiNi/\Sigma Ni$ (1)

Weight Average Molecular Weight $Mw=\Sigma Mi^2Ni/\Sigma MiNi$ (2)

where Mi: molecular weight of each molecule i and Ni: number of molecule i of molecular weight Mi.

In the above, with reference to FIGS. 10 through 17, it has been described in principle based on the measured values as to enhancement of the curing reaction of photocurable resin compositions by applying the IR irradiation prior to the UV irradiation. In other words, in the first place, (1) with reference to FIGS. 10 and 11, an increase of the conversion rate of the acryl group has been shown by the FTIR measurements; (2) with reference to FIGS. 12 and 13, an increase in the decomposition efficiency of Irgacure 184 has been shown by the GC-MS measurements; and, moreover, (3) with reference to FIGS. 14 through 16, an increase in the conversion rate from monomers to polymers has been shown by the GPC measurements. The measured results according to these three measurement methods all indicate enhancements of the curing reaction by applying the IR irradiation prior to the UV irradiation as compared with the case with the UV irradiation alone, but use has been made of Irgacure 184 only as the photo polymerization initiator in any of these measurements. In order to study the photo curing reactions of photocurable resin compositions qualitatively, it is critical that the photo polymerization initiators as well as the photocurable resin compositions be thermally stable. This is because if the photocurable resin compositions and the photo polymerization initiators were to sublimate or evaporate due to the heat produced at the time of UV irradiation, the qualitative measurements of the photo curing reaction would become inaccurate. For example, there are other photo polymerization initiators such as Irgacure 127 (manufactured by BASF, compound name: 2-hydroxy-1-{4-[4-(2-hydroxy-2-methyl-propionyl)-benzil]-phenyl}-2-methyl-1-propane-1-one), and it is known to be much lower in sublimability as compared with Irgacure 184. That is, as shown in FIG. 18 which represents weight loss curve characteristics as a function of temperature, Irgacure 127 has a sublimation temperature which is much higher than that of Irgacure 184 and thus it is believed to be less probable to sublimate due to the heat produced at the time of UV irradiation so that its density is believed to be less probable to change during the curing reaction by the UV irradiation.

From the above observations, in order to attain a much more accurate comprehension of the photo curing reaction, it has been determined to take the above-mentioned 3 kinds of measurements using Irgacure 127 as the photo polymerization initiator and then measurements have been taken once more using polyester acrylate M-8100 (manufactured by Toagosei co.) for measurements of the double bond conversion of acryl group according to the FTIR measurement method of (1), using cyclohexanedimethanol monoacrylate (manufactured by Nihonkasei co.) for measurements of the photo decomposition rate of Irgacure 127 according to the GPC method of (2), and using methoxypolyethylene glycol (#400) monoacrylate (AM-90G) (manufactured by Shinnakamura Kagaku co.) for measurements of the molecular weight of polymerized polymers according to the GPC measurement method of (3), as photocurable resin compositions since these are less in weight loss due to the heat at the time of UV irradiation.

Incidentally, the test samples used in these measurements are those manufactured basically according to the above-described method for manufacturing test samples. In other words, each of the test samples is A4 in size and comprises a support of a PET film 100 having a thickness of 100 micrometers and a photocurable resin composition coated thereon. However, as regards the thickness of a coated photocurable resin composition, it was set at 10 micrometers for (1) FRIT measurements and (3) GPC measurements and at 5 micrometers for (2) GC-MS measurements.

(1) Measurements of Reaction Rate of Acryl Group Double Bond According to FTIR

Figure 19:
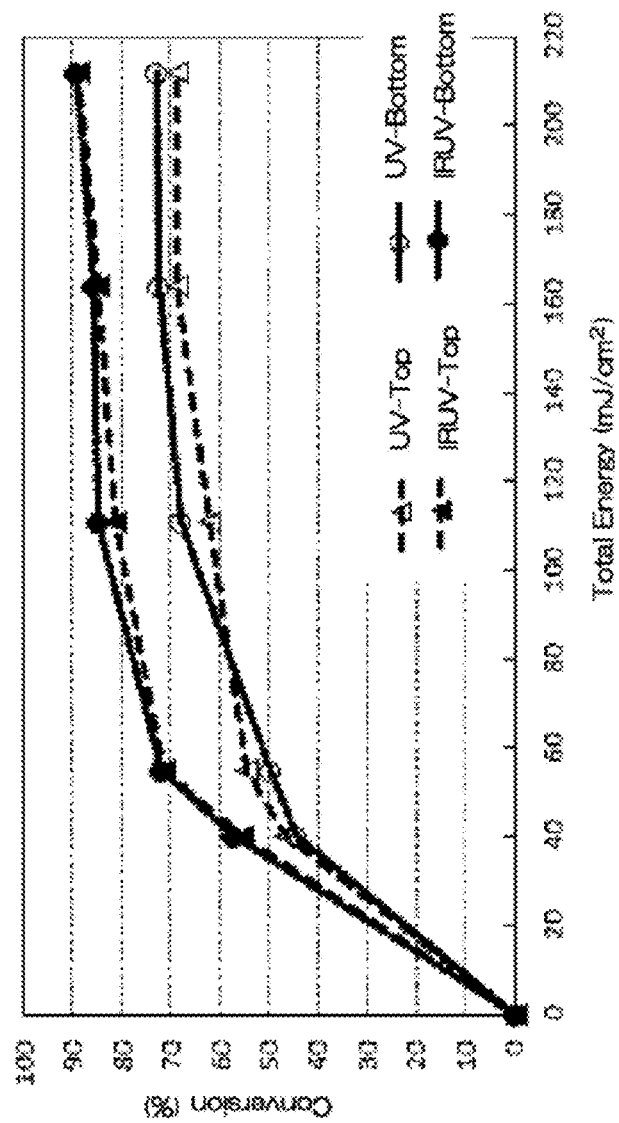
FIG. 19 is a graph showing variations in the acrylic group double bond conversion rate relative to UV irradiation energy.

In this case, a plurality of test samples were manufactured by coating a PET film support with polyester acrylate M-8100 (manufactured by Toagosei co.) containing 5% of Irgacure 127 to the thickness of 10 micrometers. These test samples were UV cured using the above-described IR-UV hybrid curing system with the IR irradiation amount set at constant (IR output: 33 W/cm, IR irradiation time: 1.2 seconds) while changing the amount of UV irradiation to respective test samples by changing the output of UV lamp and then the double bond conversion rate of acryl group was determined for each of the cases. Curves indicating the variations of the acryl group double bond conversion rate thus obtained are shown in FIG. 19 as a function of UV irradiation energy. Incidentally, in FIG. 19, legend "Top" such as "UV-TOP" and "IRUV-Top" indicates the front surface side of the coating layer and refers to the data averaged over a front surface side portion from the surface to the depth of 2 micrometers into the coating layer, whereas, legend "Bottom" such as "UV-Bottom" and "IRUV-Bottom" indicates the bottom surface side of the coating layer between the coating layer and the PET film support and refers to the data averaged over a bottom surface portion from the bottom surface to the depth of 2 micrometers into the coating layer. Besides, "UV" refers to the data for the case with the UV irradiation alone and without the pre IR irradiation, whereas, "IRUV" refers to the data for the case in which the UV irradiation was applied after the application of the pre IR irradiation. From this result, on the whole, it can be understood that the double bond conversion rate of acryl group increases due to the application of pre IR irradiation. It is also understood that the reaction rate increases approximately 10% or more for the same amount of UV irradiation energy when the pre IR irradiation was applied as compared with the case in which the pre IR irradiation was not applied.

(2) Measurements of Decomposition Efficiency of Photo Polymerization Initiator According to GC-MS According to the GC-MS (Gas Chromatography-Mass Spectrometry), a material to be examined is first converted to a gas and then use is made of the chromatography method to carry out separation of components (i.e., so-called gas chromatography (GC)). Then mass spectra (MS) are measured with respect to respective single components thus separated by GC and the components are identified from such information as molecular weights and cleavage patterns. Measurements were taken for cured products cured by UV irradiation according to such GC-MS method, and a verification was made on how the decomposition efficiency of a photo polymerization initiator (or polymerization initiation active species production efficiency) could change due to the application of pre IR irradiation prior to the UV irradiation. Similarly with the case of before-mentioned Irgacure 184, Irgacure 127 used in this verification also causes a cleavage reaction due to UV irradiation to thereby produce radicals, and those radicals that have not contributed to the polymerization initiation in the curing reaction by the application of UV irradiation become various decomposition products which remain in a polymerized polymer of a cured film. In this instance, by comparing a ratio between the unreacted Irgacure 127 remaining in the cured film and the decomposition products, it can be determined whether or not the decomposition efficiency of Irgacure 127, which is a photo polymerization initiator, increases due to the pre IR irradiation. If the decomposition efficiency of Irgacure 127 were the same between the case with the pre IR irradiation and the case without the pre IR irradiation, this ratio must remain at constant.

Figure 20:
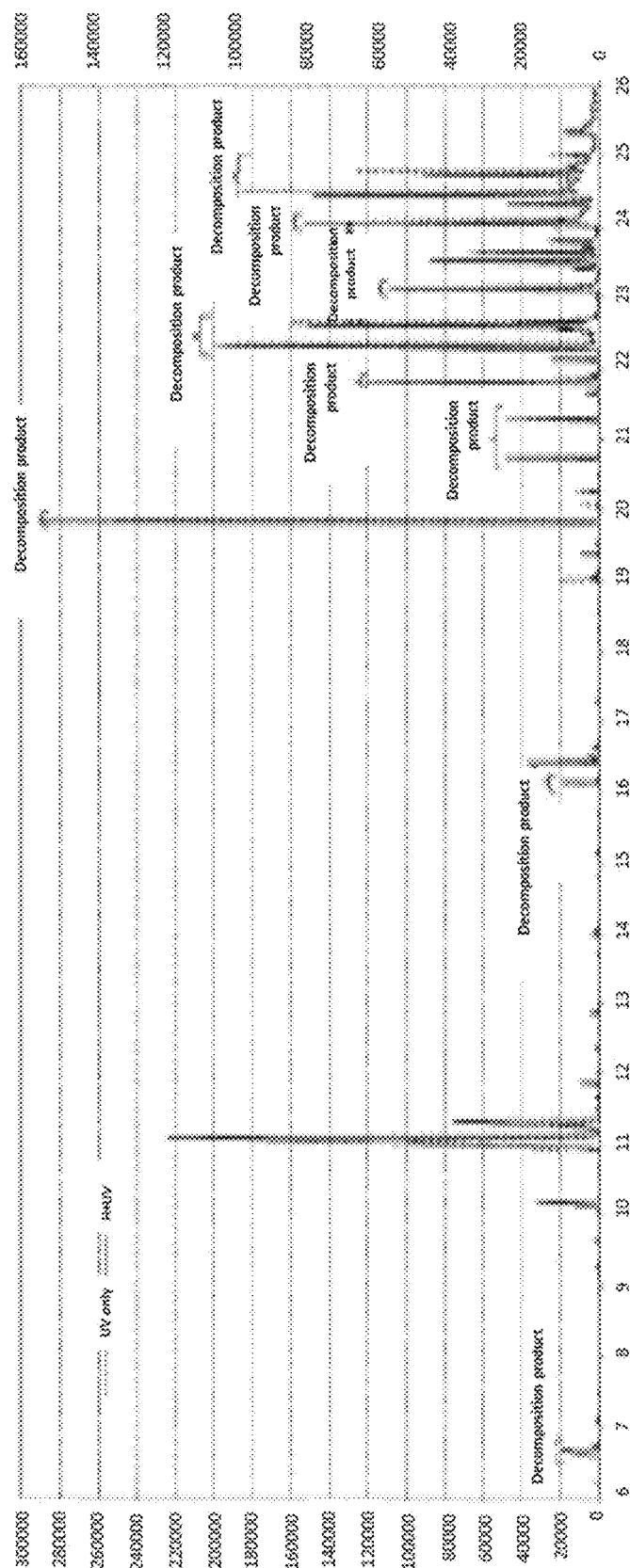
FIG. 20 is a graph showing a distribution of the decomposition products based on the photo polymerization initiator upon UV irradiation.

In this case, a plurality of test samples were manufactured by coating cychlohexane dimethanol monoacrylate (manufactured by Nihon Kasei co.) containing 50% of Irgacure 127 on a PET film support to the thickness of 5 micrometers. Incidentally, cyclohexane dimethanol monoacrylate was used as a support as a solution site for applying UV irradiation to Irgacure 127. These test samples were cured using the above-described IR-UV hybrid curing system, and with respect to cured films obtained by curing the coated films by applying only the UV irradiation (output: 240 W/cm, irradiation time: 0.6 seconds) without the pre IR irradiation and also cured films obtained by curing the coated films by applying the UV irradiation under the same conditions after applying the pre IR irradiation (output: 33.3 W/cm, irradiation time: 1.2 seconds), GC-MS measurements were taken. Respective measured data thus obtained are shown in FIG. 20, wherein measured data indicated by the dotted line is the case of curing with the UV irradiation alone and without the pre IR irradiation, and measured date indicated by the solid line is the case of curing in which the UV irradiation was applied after the pre IR irradiation. In FIG. 20, portions indicated as "unreacted initiator" indicate an unreacted, remaining amount of Irgacure 127, and it can be seen that the unreacted, remaining amount decreases (i.e., the solid portion is less in amount than the dotted portion) due to the application of the pre IR irradiation as compared with the case of the UV irradiation alone. Moreover, in FIG. 20, peaks indicated as "decomposition product" correspond to various decomposition products produced by radicals which, in turn, are produced by the cleavage reaction of Irgacure 127 due to the UV irradiation. On the other hand, in FIG. 20, peaks in a range between 10 and 11 minutes in the abscissa originate from cyclohexane dimethanol monoacrylate and thus have nothing to do with the decomposition products of Irgacure 127 and the unreacted, remaining initiators. Incidentally, in fact, the amount of decomposition of the photo polymerization initiator depends on the absorption energy due to UV irradiation and it must remain at constant under the above-described UV irradiation conditions (output: 240 W/cm, irradiation time: 0.6 seconds). However, in the result of measurements of FIG. 20, it is shown that the amount of decomposition products increases (i.e., the area of the signal increases) due to the application of the pre IR irradiation prior to the UV irradiation.

Figure 21:
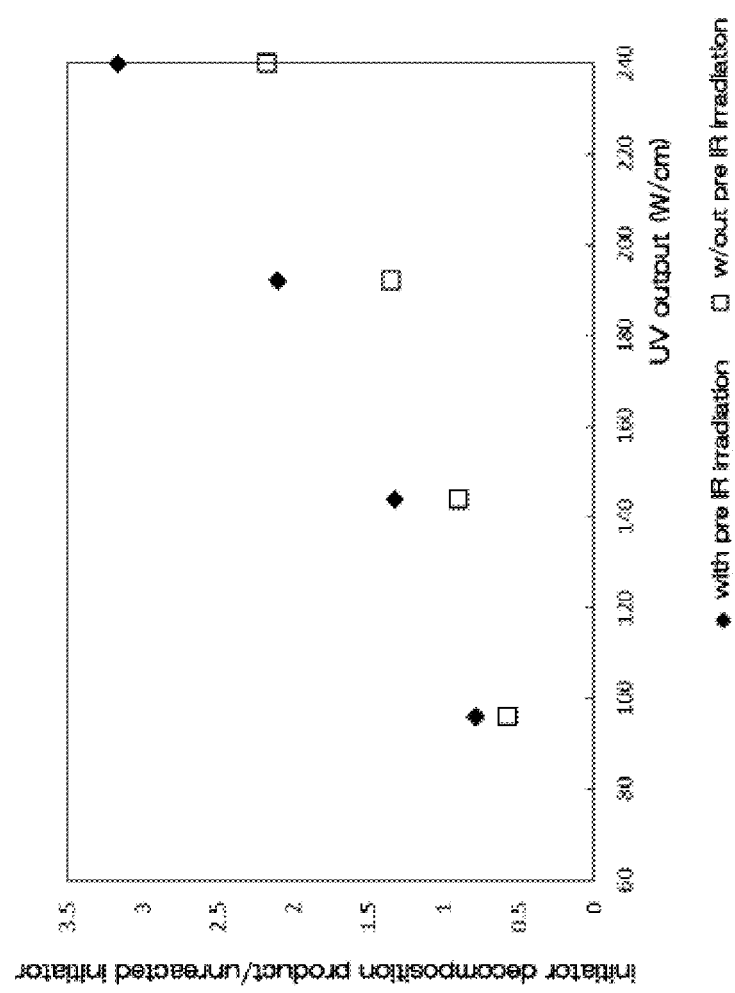
FIG. 21 is a graph showing the ratio of the amount of production of decomposition products relative to the remaining amount of unreacted photo polymerization initiator.

Under the circumstances, based on the measured data of FIG. 20 and similar GC-MS measured data obtained under different UV irradiation conditions, a ratio between the unreacted, remaining photo polymerization initiator (Irgacure 127) and various decomposition products was calculated for respective UV irradiation conditions and its result is shown in FIG. 21. As shown in FIG. 21, it can be seen that the ratio between the unreacted, remaining photo polymerization initiator and the decomposition products becomes higher due to the application of the pre IR irradiation, and, moreover, its difference becomes larger as the UV irradiation energy increases. Thus, from this result, it can be understood that the decomposition efficiency of photo polymerization initiators is enhanced due to the application of the pre IR irradiation.

(3) Molecular Weight Measurements According to GPC

In this case, a plurality of test samples were manufactured by coating methoxypolyethylene glycol (#400) monoacrylate (AM-90G) (manufactured by Shinnakamura Kagaku co.) containing 2% of Irgacure 127 on a PET film support to the thickness of 10 micrometers. These test samples were cured by using the above-described IR-UV hybrid curing system, whereby with the amount of IR irradiation maintained at constant (IR output: 33 W/cm, IR irradiation time: 1.2 seconds), respective test samples were UV cured while varying the amount of UV irradiation by varying the output of the UV lamp and the molecular weights of the resulting respective polymers were determined by GPC (Gel Permeation Chromatography).

Figure 22:
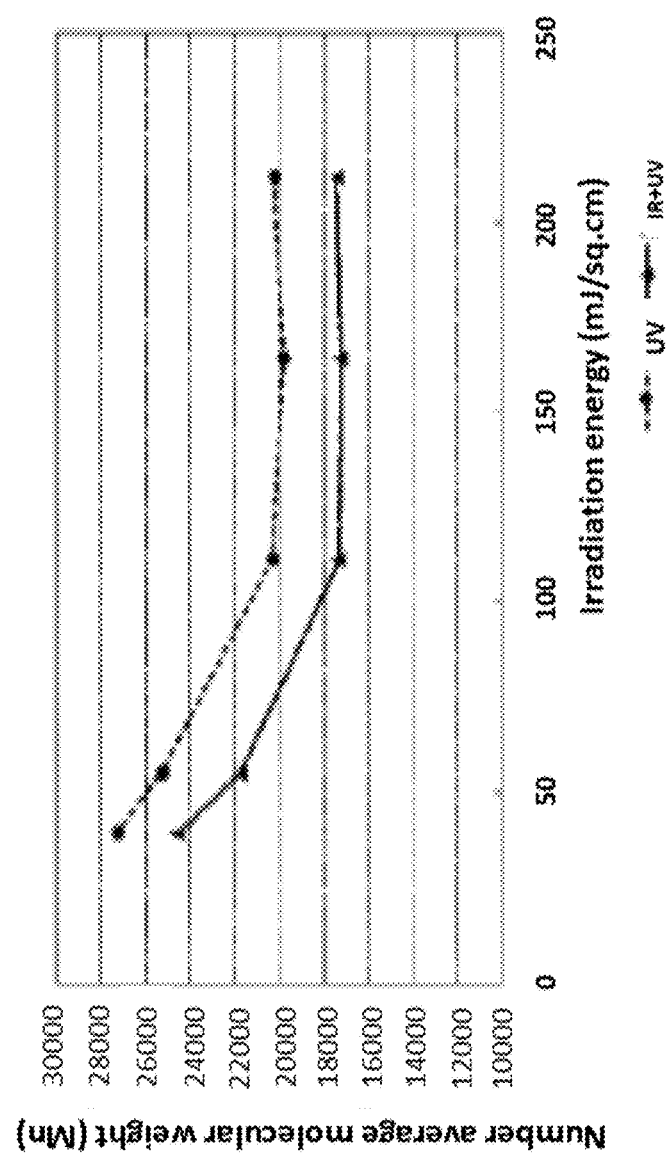
FIG. 22 is a graph showing the number-average molecular weight of the polymer obtained by photo initiated polymerization of monofunctional polymer (AM-90G).

In general, in a curing reaction due to UV irradiation, use is made of functional monomers, but if multifunctional monomers are used, the polymer becomes insoluble due to its cross-linking reaction, thereby making it difficult to carry out a chromatography analysis such as GPC. On the other hand, in the case of implementing the photo polymerization using a monofunctional acrylate such as AM-90G, the cross-linking reaction does not proceed and a linear polymer soluble to a solvent can be obtained. By analyzing the molecular weight of a polymer thus obtained in this manner, information regarding the polymerization behavior of the polymer can be obtained. Under the circumstances, the number average molecular weights of polymers obtained by varying the UV irradiation energy by varying the output of the UV lamp while maintaining the amount of IR irradiation at constant as described above are shown in FIG. 22. The number average molecular weight is defined by equation (1). The number of polymers produced in this polymerization depends on the amount of photo polymerization initiating active species produced by the UV irradiation. In other words, the more the amount of photo polymerization initiating Active species produced, the more the number of molecules of polymers produced. Under the presence of a certain quantity of polymerizable acryl monomers, theoretically, the more the number of molecules of polymers, the lower the number average molecular weight becomes. As shown in FIG. 22, the number average molecular weight of polymers obtained by applying the UV irradiation to AM-90G decreases as the UV irradiation energy increases until a certain level is reached, which is consistent with the above-described theoretical considerations. And it is seen that the polymers (UV) obtained by the UV irradiation alone always have larger number average molecular weights than the polymers (IR+UV) obtained by applying the UV irradiation after the application of the IR irradiation.

Figure 23:
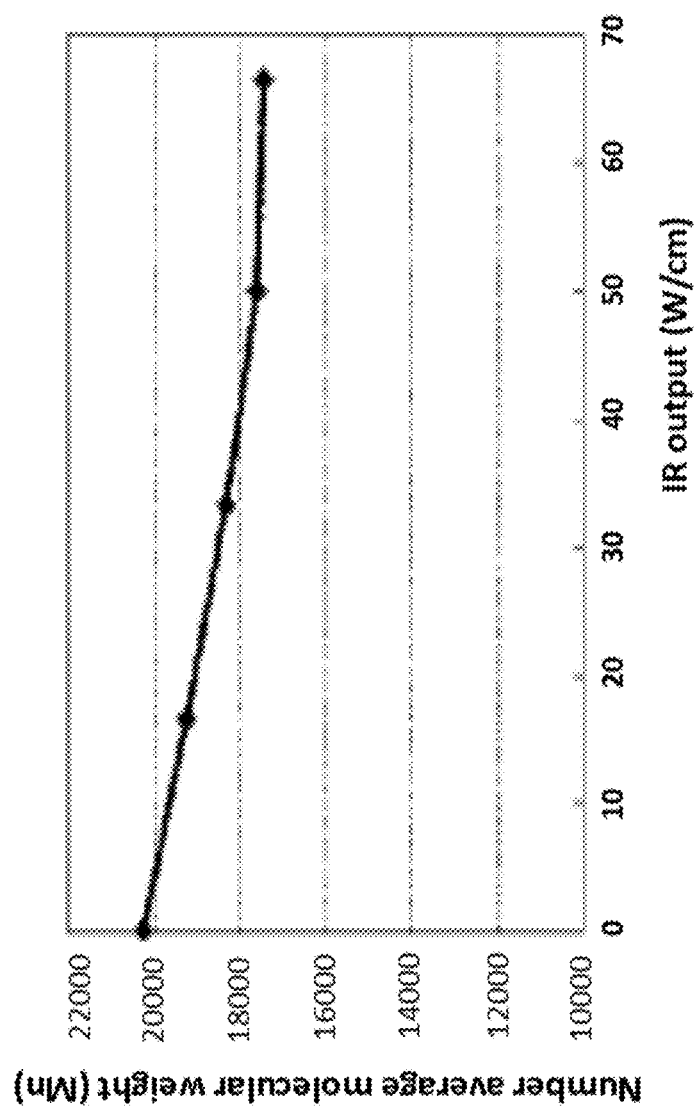
FIG. 23 is a graph showing the pre IR irradiation intensity dependency of the number-average molecular weight.

Furthermore, variations of the number average molecular weights of the polymers obtained by changing the output of the pre IR irradiation while keeping the UV irradiation conditions unchanged (output: 240 W/cm) are shown in FIG. 23. As shown in FIG. 23, it can be seen that as the output of the pre IR irradiation increases, the number average molecular weight of the polymers produced gradually decreases.

From these two results described above, it can be seen that if the UV irradiation conditions remain unchanged, the number average molecular weight of the polymers in a cured film decreases by the application of the pre IR irradiation. This then suggests the fact that the amount of production of polymerization initiating active species at the time of UV irradiation increases by the application of the pre IR irradiation.

Incidentally, the result of decreasing of the number average molecular weight shown in FIG. 22 is opposite to the before-mentioned result of increasing of the number average molecular weight shown in FIG. 17; however, it should be borne in mind that they differ in the composition of photo initiation polymerization system. That is, FIG. 17 is for the composition of benzil acrylate containing 5% of Irgacure 184, whereas, FIG. 22 is for AM-90G containing 2% of Irgacure 127. And, as described before, since Irgacure 127 is higher in its sublimation temperature than Irgacure 184, it is less susceptible to sublimate/evaporate due to the heat produced at the time of application of IR irradiation and UV irradiation, and for this reason, it is believed that a region of lower measured values of number average molecular weight exists.

Embodiment 6

As described above, since the decomposition efficiency of photo polymerization initiators is enhanced by the pre IR irradiation, there is a possibility that scratch resistance characteristics comparable to or higher than the case without the pre IR irradiation may be produced even if the amount of photo polymerization initiators to be contained in a photocurable resin composition was reduced. Thus, in this embodiment, a verification was conducted as to the effects of the pre IR irradiation when the amount of photo polymerization initiators was reduced. Specifically, for TMPTA containing 5% of Irgacure 184, the UV irradiation alone was applied without the pre IR irradiation, whereas, for TMPTA containing 2% of Irgacure 184, both of the pre IR irradiation (irradiation output: 25-33.3 W/cm, irradiation time: 1.2-14.0 seconds) and the UR irradiation were applied, and, then the scratch resistance characteristic tests were conducted for them. Its result is shown in FIG. 24.

Figure 24:
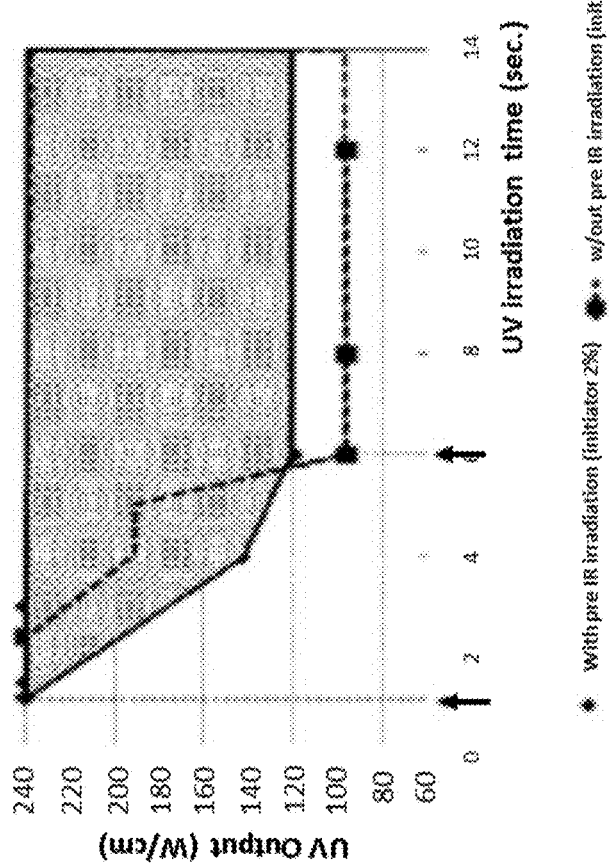
FIG. 24 is a graph showing the effect of the density of photo polymerization initiator for the scratch resistance characteristics by pre IR irradiation.

As is obvious from a graph of FIG. 24, in the system of 2% of photo polymerization initiator, even if the pre IR irradiation is applied, it is necessary for the output of UV irradiation to be 120 W/cm or more so as to produce the scratch resistance characteristics. At 120 W/cm, it is necessary for the UV irradiation time to be approximately 6 seconds or more. On the other hand, in the system of 5% of photo polymerization initiator, the scratch resistance characteristics are produced approximately at 90 W/cm or more even without the pre IR irradiation. At 90 W/cm, it is likewise necessary for the UV irradiation time to be approximately 6 seconds or more. It is however shown that with the UV output being equal to or above 120 W/cm, the scratch resistance characteristics can be produced with much shorter UV irradiation time than the case without the pre IR irradiation by applying the pre IR irradiation. For example, at 240 W/cm, which is the maximum UV irradiation output in this verification, minimum required UV irradiation time to produce the scratch resistance characteristics by applying the pre IR irradiation is 1.2 seconds, which is significantly shorter than approximately 2.5 seconds for the case without the pre IR irradiation. In this manner, even if the amount of photo polymerization initiators is reduced, since the UV irradiation time can be shortened by applying the pre IR irradiation, the density of the photo polymerization initiators in the formulation can be reduced, which, in turn, indicates the fact that the density of the remaining unreacted photo polymerization initiators in a UV cured film can be reduced.

Figure 25:
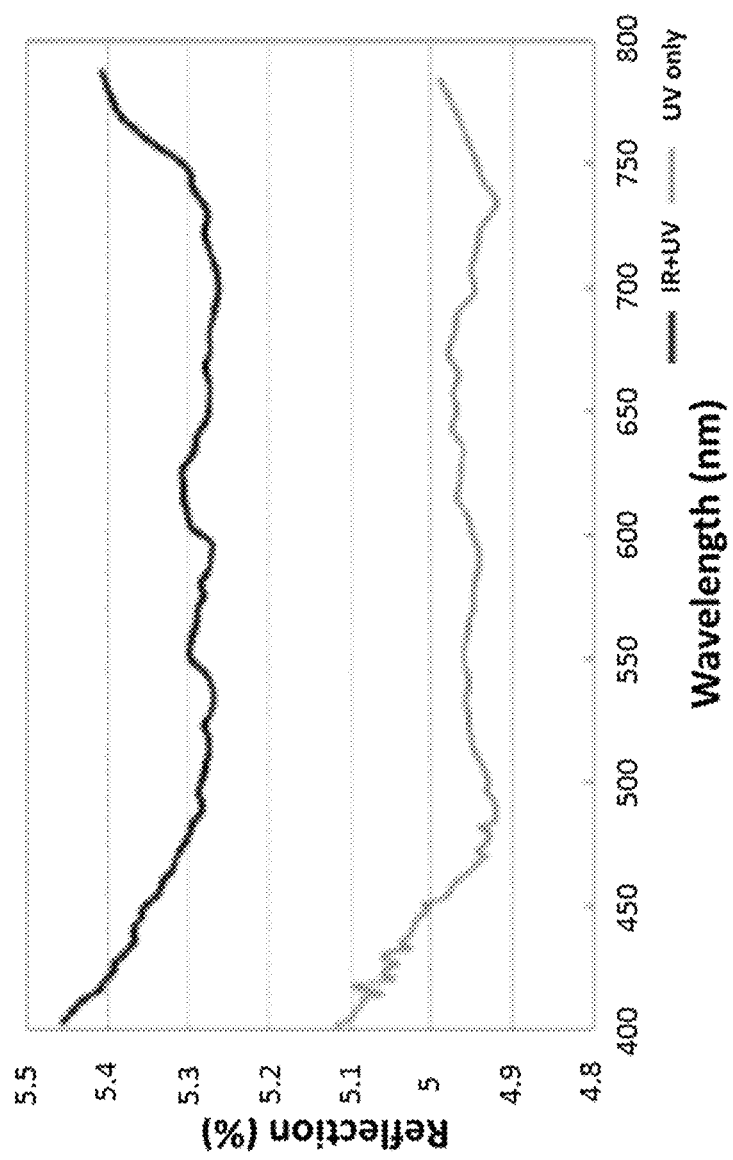
FIG. 25 is a graph showing the result of measurements of reflectance of cured photocurable resin compositions when exposed to UV irradiation alone and to IR+UV irradiation.

In addition, the fact that the decomposition efficiency of the photo polymerization initiator is enhanced by the pre IR irradiation may suggest an increase in the cross-link density of the polymers in a cured film and thus an increase in the density of the cured film itself. Under the circumstances, so as to verify this, the reflectance of cured films was measured and its result is shown in FIG. 25. As shown in FIG. 25, measured results of the reflectance of a cured film obtained by applying only a UV irradiation (output: 240 W/cm, irradiation time: 1.2 seconds) without the pre IR irradiation to a test sample including TMPTA containing 5% of Irgacure 184 reside in a range between approximately 4.9 and 5.1, whereas, measured results of the reflectance of a cured film obtained by applying the same UV irradiation after the application of the pre IR irradiation (output: 33.3 W/cm, irradiation time: 1.2 seconds) to a test sample of the same structure reside in a range between approximately 5.3 and 5.5. In this manner, since the reflectance of a cured film is shown to increase due to the application of the pre IR irradiation, it suggests an increase in the index of refraction of the cured film. As a result, it can be said that by the application of the pre IR irradiation, the density of a cured film increases so that the cured film becomes more dense in its cross-link condition.

Figure 26:
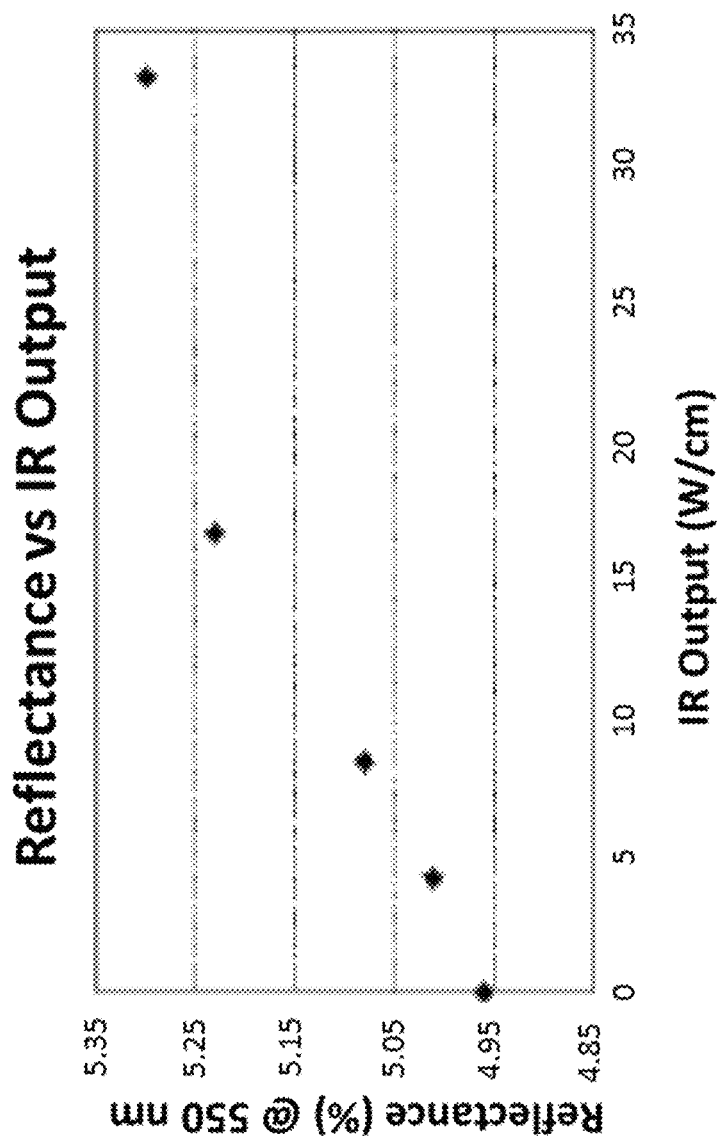
FIG. 26 is a graph showing the variation of the reflectance of a cured film obtained depending upon the level of the pre IR irradiation output.

In FIG. 25, it is shown that the reflectance at the surface of a cured product increases by applying the IR irradiation at the output of 33.3 W/cm for 1.2 seconds prior to the application of the UR irradiation, and, yet, it has been found in the present invention to be able to control the reflectance of a cured film by adjusting the output of this pre IR irradiation. That is, in accordance with one embodiment of the present invention, a cured film having a desired value of reflectance can be manufactured by controlling the dose of IR in the pre IR irradiation. In FIG. 26, there is shown the surface reflectance of cured products of TMPTA obtained by applying UV irradiation while varying only the output of pre IR irradiation from 0 to 33.3 W/cm with the UV output and irradiation time fixed at 240 W/cm and 1.2 seconds, respectively, and also the pre IR irradiation time fixed at 1.2 seconds. This figure indicates the fact that the surface reflectance of a cured product obtained by UV irradiation increases as a function of the output of the pre IR irradiation. Accordingly, with respect to the surface reflectance, an approximate curve can be determined using the output of the pre IR irradiation as a dependent variable, so that an output of pre IR irradiation in order to attain a desired value of surface reflectance can be determined using the approximate curve thus determined. Therefore, in the manufacture of an optical film or the like for which the appropriateness of surface reflectance is reflected in its function, the reflectance of the surface of a cured film can be set at a desired value simply by adjusting the output of the pre IR irradiation in its manufacturing process without modifying the material composition.

Embodiment 7

In this embodiment, since unique effects have been found to be produced by post IR irradiation (i.e., IR irradiation after UV irradiation), a verification of such unique effects has been conducted.

One aspect of this embodiment of post IR irradiation relates to the possibility of accelerating the post curing of the photo cationic curing system by the post IR irradiation. That is, since the initiation active species of the photo cationic curing system are acid, the lifetime of a curing growth process is long and a curing reaction proceeds over a long period of time after the application of UV irradiation so that a curing time period is often required. As described above, since it has been found that the pre IR irradiation can promote the curing reaction, it may be possible to promote the curing reaction to thereby reduce or eliminate the curing time period which may be required after the application of UV irradiation by applying the post IR irradiation. Under the circumstances, in order to verify this point, test samples were manufactured in the following manner.

4-functional sorbitol glycidyl ether 60 parts by weight as a curing resin, 2-functional epoxy cyclohexyl methyl-epoxy cyclohexane carboxylate (alicyclic epoxy) 40 parts by weight, 50% aryl sulfonium hexafluorophosphate salt (solvent diluent) 8 parts by weight as a photo polymerization initiator were dissolved in methyl ethyl ketone (MEK) 104 parts by weight to prepare a 50% solid content solution to thereby form a photocurable resin composition, which, in turn, was coated onto PET films to make test samples. Incidentally, these test samples were same in composition to those test samples used for the photo cationic curing system in embodiment 5.

Figure 27A:
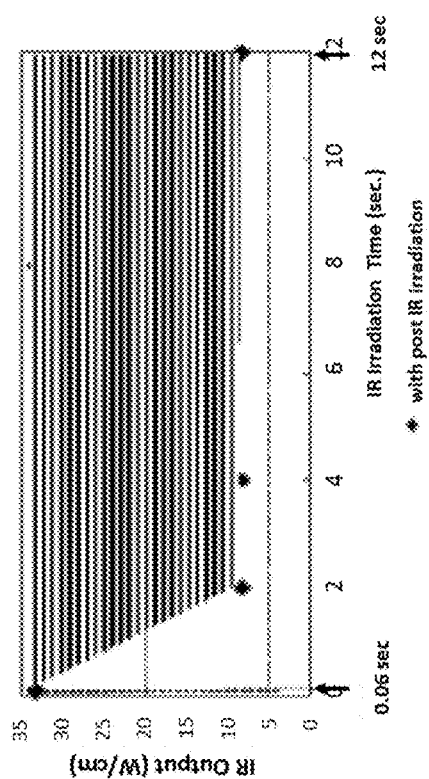

Using these test samples, UV irradiation was applied and then IR irradiation (i.e., post IR irradiation) was applied to investigate the accelerating effects of curing reaction due to the post IR irradiation and the results are shown in a graph of FIG. 27A. In this case, the output of IR irradiation was set at 33.3 W/cm. The accelerating effects of curing reaction were determined based on the UV irradiation time required for processed test samples to produce the scratch resistance characteristics. In other words, as shown in FIG. 27A, with the UV irradiation output at 84 W/cm, the minimum required UV irradiation time is 4 seconds, which is significantly shorter than the case of FIG. 9A and FIG. 9B in which no post IR irradiation was applied. Besides, with the UV irradiation output at 240 W/cr, the minimum required UV irradiation time is 0.06 seconds, which is also significantly shorter than the case of FIG. 9A and FIG. 9B (0.6 seconds) in which no post IR irradiation was applied.

Figure 27B:
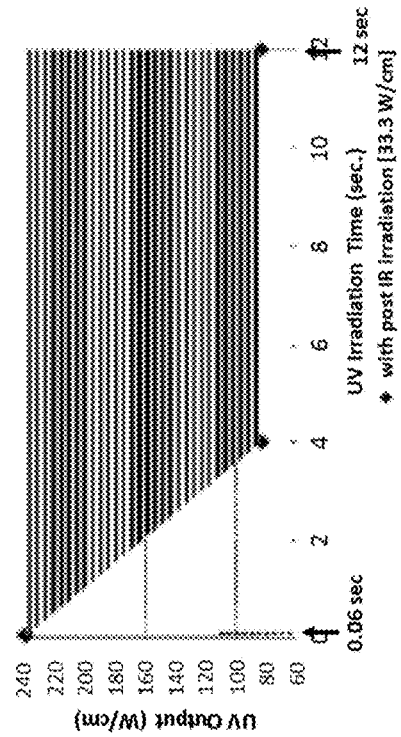

Furthermore, the results of investigating the accelerating effects of curing reaction due to the post IR irradiation for the case in which the IR irradiation output was varied while maintaining the UV output at 240 W/cm, which is the maximum in the present verification, are shown in FIG. 27B. In this case, also, the determination of the accelerating effects of curing reaction was based on the IR irradiation time which was necessary for the processed test samples to produce the scratch resistance characteristics. That is, as shown in FIG. 27B, the minimum IR irradiation time which is necessary to produce the scratch resistance characteristics with the output of the post IR irradiation at 8.3 W/cm, which is the minimum value in the present verification, is 2 seconds, and, in addition, the minimum required IR irradiation time necessary to produce the scratch resistance characteristics with the output of the post IR irradiation at 33.3 W/cm, which is the maximum value in the present verification, is 0.06 seconds.

From the above, it can be seen that the post curing of the photo cationic curing system can be accelerated by applying the post IR irradiation. With this, the tack-free time can be shortened and the curing time period can be shortened. Incidentally, although the verification was conducted on the photo cationic curing system in this embodiment, it is believed that if the curing time period is required for those photocurable resin compositions other than the photo cationic curing system, the curing time period can be shortened or eliminated by applying the post IR irradiation.

Figures 28, 29:
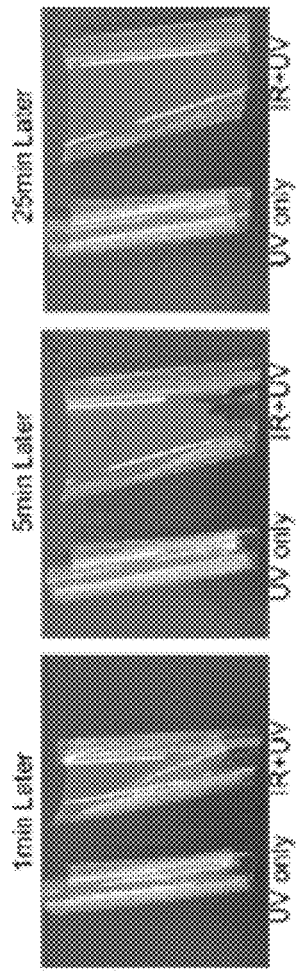
FIG. 28 is a table showing the result of a test for the appearance of effect of post curing by IR irradiation while varying the time from the UV irradiation to the IR irradiation.
FIG. 29 shows photos showing the curl reduction effect when the IR irradiation is applied after the UV irradiation.

By the way, since the active species of photo cationic curing system have long lifetimes, it is believed that the timing of applying the post IR irradiation can be set up to a point in time considerably after the UV irradiation. Thus, a test was conducted to determine the timing of application of the post IR irradiation after the UV irradiation in order to obtain accelerated effects of the post curing and its results are shown in FIG. 28. As is clear from FIG. 28, in particular, in the case of the photo cationic curing system, it can be seen that the accelerated effects of the post curing can be obtained by applying the post IR irradiation within one hour after the UV irradiation. Incidentally, although the results of FIG. 28 relate to the photo cationic curing system, similar results are believed to be obtained for those photocurable resin compositions other than the photo cationic curing system.

Next, the second aspect in this embodiment of post IR irradiation relates to relaxation of the curing shrinkage stress caused by the UV curing reaction by the application of the post IR irradiation, thereby reducing curl and producing cracking suppression effects.

As described before, the acceleration effects of the post curing within a cured film can be obtained by applying the post IR irradiation within a predetermined time period (one hour in the case of photo cationic curing system) after the UV irradiation; on the other hand, as regards the stress relaxation effects, it has been found that the stress relaxation effects can be produced by applying the post IR irradiation at any time after the UV irradiation irrespective of the elapsing time after the UV irradiation. For example, as the post IR irradiation conditions which are necessary to produce the stress relaxation effects, the minimum required IR irradiation time was 24 seconds for the case of the output of IR irradiation at 3.3 W/cm, and the minimum required IR irradiation time was 0.3 seconds for the case of the output of IR irradiation at 33.3 W/cm.

Specific examples in which the stress relaxation effects (in particular, curl reduction effects) were produced by the post IR irradiation after the UV irradiation are shown in the photos of FIG. 29. In FIG. 29, the left most photo is a comparison example showing the condition one minute after the post IR irradiation: the middle photo shows a comparison example showing the condition 5 minutes after the post IR irradiation; and the right most photo is a comparison example showing the condition 25 minutes after the post IR irradiation, wherein, in each of the comparison examples, "UV only" refers to a test sample which was subjected to UV irradiation only without the application of the post IR irradiation, whereas, "IR+UV" refers to a test sample which was subjected to the post IR irradiation after the UV irradiation. The test sample employed in the verification of this embodiment included a PET film having a film thickness of 50 micrometers as a support and TMPTA containing 5% of Irgacure 184 coated thereon to the film thickness of 10 micrometers as a photocurable resin composition. The UV irradiation conditions included the UV output of 240 W/cm and the UV irradiation time of 1.2 seconds, whereas, the post IR irradiation conditions includes the IR output of 33.3 W/cm and the IR irradiation time of 2.4 seconds, whereby the post IR irradiation was applied 2.4 seconds after the application of the UV irradiation.

As is clear from FIG. 29, it can be seen that in the case when the post IR irradiation is applied, the curl caused by the curing process gradually reduces as a function of time after the application of the post IR irradiation.

Figure 30:
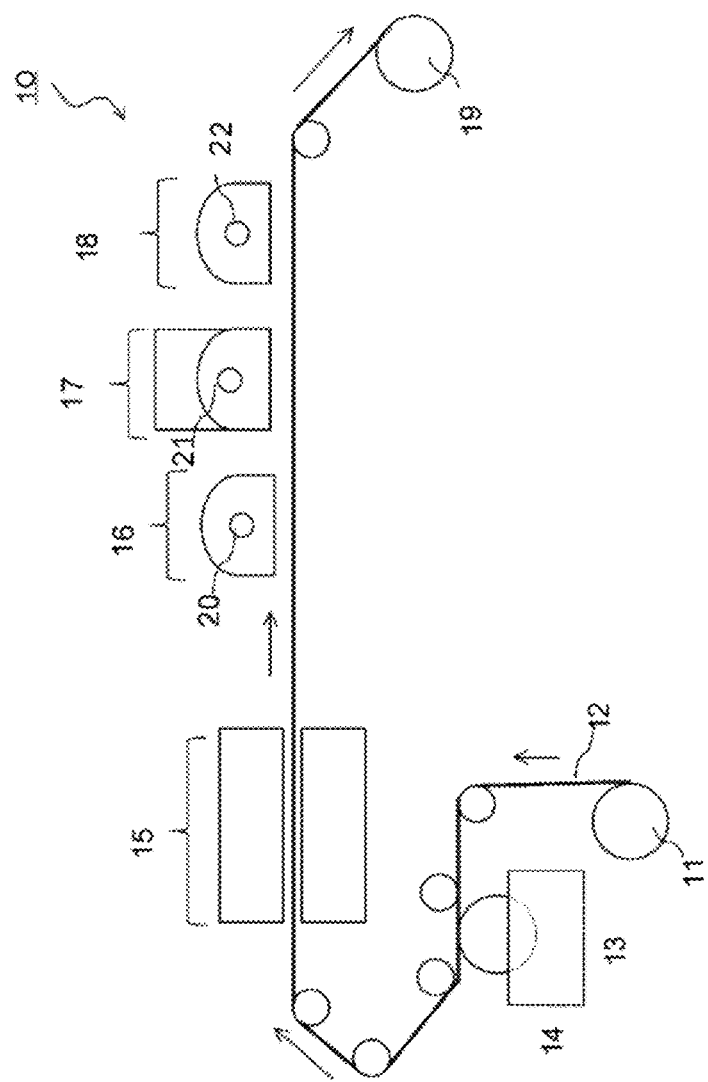
FIG. 30 is a schematic illustration showing an apparatus for curing a photocurable resin composition configured based on an embodiment of the present invention.

Next, with reference to FIG. 30, a description will be had with respect to an apparatus 10 for curing a photocurable resin composition constructed based on one embodiment of the present invention. An elongated base material 12 is wound around a feed roll 11 and the base material 12 is fed out in a transport direction indicated by the arrow. As the base material 12, use may be made, for example, of a PET film. The base material 12 then passes through a coating zone 12 during which a coating solution 14 is coated onto the base material 12 to a predetermined film thickness. As the coating solution 14, use may be made of a 50% solid content solution comprising the before-mentioned photocurable resin composition. The base material 12 to which the coating solution 14 has been coated to a predetermined film thickness then passes through a drying zone (IR lamp, hot air, electric heater, etc.) 15, thereby substantially removing volatile components such as a solvent from the coating solution coated onto the base material 12 to form a film of the photocurable resin composition having a desired thickness on the base material 12 in a sufficiently dried condition. The base material 12 then passes sequentially through an IR irradiation zone 16, a UV irradiation zone 17 and an IR irradiation zone 18, thereby having the photocurable resin composition formed on the base material 12 in a desired film thickness cured. A predetermined number of IR heaters 20 are arranged in the IR irradiation zone 16; a predetermined number of UV light sources 21 are arranged in the UV irradiation zone; and a predetermined number of IR heaters 22 are arranged in the IR irradiation zone 18. After having been cured, the base material 12 is wound onto a take-up roll 19. Incidentally, the IR irradiation zone 16 is provided to conduct the above-described pre IR irradiation, and the IR irradiation zone 18 is provided to conduct the above-described post IR irradiation. Thus, in the case when both of the pre IR irradiation and the post IR irradiation are to be applied, both of the IR irradiation zones 16 and 18 are activated, whereas, in the case when either one of the pre IR irradiation and the post IR irradiation is to be applied, only one of the IR irradiation zone 16 and 18 is activated.

As described above, in accordance with the present invention, it is characterized by applying the IR irradiation at least one of before and after the UV irradiation, and unique effects produced by such pre IR irradiation and post IR irradiation will now be described.

First, the unique effects produced by the pre IR irradiation include the following.

(1) Elimination of Solvent History

By eliminating the solvent history by high temperature heating for a short period of time, the most stable conformation of a material molecule after drying of solvents and the most stable dispersion state of the particular dispersion can be formed. Because of this, enhancements of the adhesion, flexibility and smoothness of a cured film, reduction of curl, increase in the index of refraction, etc., can be expected.

(2) Elimination of Coating/Printing History

By eliminating the history of stresses in a material produced at the time of coating/printing, enhancements or the like of the adhesion, flexibility, and smoothness of a cured film can be expected.

(3) Lowering of Material Viscosity

By lowering of viscosity, a much higher reaction rate can be obtained and enhancements or the like of the degree of hardness (cross-linking density) and the refractive index can be expected. Besides, it also becomes possible to expect the formation of a surface condition which is much higher in smoothness.

(4) Promotion of Bleed of Additives or the Like to a Surface

Next, the unique effects produced by the post IR irradiation include the following.

(1) Promotion of Stress Relaxation

By high temperature heating for a short period of time after the UV curing, the relaxation times of the stresses caused by cross-linking reactions are shortened, and, thus, it becomes possible to expect improvements in the adhesion and flexibility of a cured film, reduction of curl, etc.

(2) Acceleration of Post Curing Rate of Cationic Curing System

By the acceleration of the post cure rate, it becomes possible to expect enhancements in the productivity of cationic curing system and enhancements in the stability of curing process, etc.

(3) Reduction of Decomposition Smell of Photo Polymerization Initiators

It becomes possible to expect reduction or elimination of the decomposition smell which is one of the problems in the UV curing process.

While several embodiments of the present invention have been described in detail with respect to their specific structures, it goes without saying that the present invention should not be limited to these specific embodiments and various modification may be made without departing from the Technical Scope of the present invention.

DESCRIPTION OF SYMBOLS

1: IR/UV hybrid irradiating system
2: endless belt
3: 1st row IR irradiation device
3a: IR lamp
4: 2nd row IR irradiation device
4a: IR lamp
5: UV irradiation device
5a: UV lamp
10: curing apparatus
11: feed roll
12: base material
13: coating zone
14: coating solution
15: drying zone
16: IR irradiation zone
17: UV irradiation zone
18: IR irradiation zone
19: take-up roll
20: IR heater
21: UV light source
22: IR heater

What is claimed is:

1. An apparatus for curing a photocurable resin composition, comprising:
   transporting means for transporting a photocurable resin composition including at least one photo polymerization initiator, along a predetermined path;
   driving means for driving the transporting means at an arbitrarily set transport velocity;
   heating means for removing volatile components from the photocurable resin composition;
   an infrared ray irradiation device positioned above the transport path downstream of the heating means for applying infrared ray having a wavelength between 1 and 6 microns to the photocurable resin composition in order to increase a decomposition efficiency of said at least one photo polymerization initiator; and
   an ultraviolet ray irradiation device positioned above the transport path and downstream of the infrared ray irradiation device for applying ultraviolet ray to the photocurable resin composition for a predetermined period of time.

2. The apparatus of claim 1, wherein the predetermined period of time is an ultraviolet ray irradiation time shorter than an irradiation time which is necessary for the photocurable resin composition to reach a predetermined degree of curing by an ultraviolet ray irradiation of said ultraviolet ray irradiation device alone, thereby producing a degree of curing equal to or above the predetermined degree of curing.

3. The apparatus of claim 2, wherein the ultraviolet ray irradiation device applies the ultraviolet ray to the photocurable resin composition within 14 seconds after the application of the infrared ray by the infrared ray irradiation device.

4. The apparatus of claim 1, further comprising a post infrared ray irradiation device positioned above the transport path and downstream of the ultraviolet ray irradiation device for applying additional infrared ray to the photocurable resin composition so as to at least reduce a curing time period and/or produce stress relaxation effects.

5. The apparatus of claim 4, wherein the additional infrared ray is applied to the photocurable resin composition within one hour after the application of the ultraviolet ray by the ultraviolet ray irradiation device.

* * * * *